(12) United States Patent
Yoshida et al.

(10) Patent No.: US 6,249,353 B1
(45) Date of Patent: *Jun. 19, 2001

(54) IMAGE EDITING APPARATUS

(75) Inventors: Akinori Yoshida, Nishio; Shigeru Sawada, Toyokawa; Takao Fujiwara, Toyohashi, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/693,716

(22) Filed: Aug. 7, 1996

(30) Foreign Application Priority Data

Aug. 9, 1995 (JP) .................................................... 7-202941

(51) Int. Cl.[7] ............................. G06K 15/02; G06K 9/46; G06K 9/34; G06T 5/00
(52) U.S. Cl. ......................... 358/1.9; 358/452; 358/447; 358/462; 358/1.11; 382/171; 382/176; 382/177; 382/286; 382/309
(58) Field of Search ..................................... 382/171, 177, 382/170, 173, 176; 358/462, 452; 395/793, 792, 109, 110; 345/434; 707/530, 531

(56) References Cited

U.S. PATENT DOCUMENTS

| | | | | |
|---|---|---|---|---|
| 4,727,588 | * | 2/1988 | Fox et al. | 382/177 |
| 4,998,285 | * | 3/1991 | Suzuki et al. | 382/171 |
| 5,091,964 | * | 2/1992 | Shimomura | 382/176 |
| 5,159,667 | * | 10/1992 | Borrey et al. | 382/171 |
| 5,265,242 | * | 11/1993 | Fujisawa et al. | 707/530 |
| 5,548,700 | * | 8/1996 | Bagley et al. | 395/793 |
| 5,581,633 | * | 12/1996 | Hotta et al. | 382/171 |
| 5,696,841 | * | 12/1997 | Nakatsuka | 382/176 |

FOREIGN PATENT DOCUMENTS

| | | |
|---|---|---|
| 2-121462 | 5/1990 | (JP) . |
| 2-194770 | 8/1990 | (JP) . |
| 2-268387 | 11/1990 | (JP) . |
| 3-186058 | 8/1991 | (JP) . |
| 4-153787 | 5/1992 | (JP) . |

* cited by examiner

*Primary Examiner*—Scott Rogers
(74) *Attorney, Agent, or Firm*—McDermott, Will & Emery

(57) ABSTRACT

The image editing apparatus of the present invention reads text image having a plurality of character line image along to a predetermined direction, makes histogram expressing the distribution characteristics of said text image, detects said character line image having a predetermined size based on said histogram, and performs editing process for said character line image having said predetermined size.

45 Claims, 25 Drawing Sheets

MT

| area | page | prior linked | post linked | added information |
|------|------|--------------|-------------|-------------------|
| 0 0  | 1    | 0 0          | 0 1         | .                 |
| 0 1  | 1    | 0 1          | F F         | .                 |
| 0 2  | 2    | 0 0          | 0 3         | .                 |
| 0 3  | 2    | 0 3          | F F         | .                 |
| .    | .    | .            | .           | .                 |
| .    | .    | .            | .           | .                 |

CODE MEMORY

FIG. 6(a) ET1

| area class | text size | contents conditions | editing process |
|---|---|---|---|
| 1 | over 18 | | black/white reversal centering |
| 2 | 14~18 | | overlaying fine dots |
| 3 | | | |
| 4 | | | |

FIG. 6(b) ET2

| area class | text size | contents conditions | editing process |
|---|---|---|---|
| 1 | over 24 | 1 | |
| 2 | 18~24 | 2 | moving toward right 10(mm) |
| 3 | 14~18 | 3 | moving toward right 20(mm) |
| 4 | under 14 | | delete |

FIG. 6(c) ET3

| area class | text size | contents conditions | editing process |
|---|---|---|---|
| 1 | equal or over 18 | 1 | |
| 2 | under 18 | | delete |

| page | document size (mm) | | (X,Y) coordinates of area 1 | | (X,Y) coordinates of area 2 | | (X,Y) coordinates of area 3 | |
|---|---|---|---|---|---|---|---|---|
| | main scanning direction | sub scanning direction | starting point | ending point | starting point | ending point | starting point | ending point |
| 1 | 297 | 210 | (25,30) | (40,70) | (40,30) | (50,70) | ... | ... |
| 2 | 297 | 210 | (35,30) (130,30) | (50,100) (145,100) | (25,30) | (40,70) | ... | ... |
| 3 | 297 | 210 | (50,30) | (65,70) | (60,30) (150,30) | (70,70) (160,70) | ... | ... |
| 4 | 297 | 210 | (30,30) | (45,70) | (50,30) | (60,70) | ... | ... |
| 5 | 297 | 210 | (25,30) | (40,70) | (40,30) | (50,70) | ... | ... |
| .... | | | | | | | | |

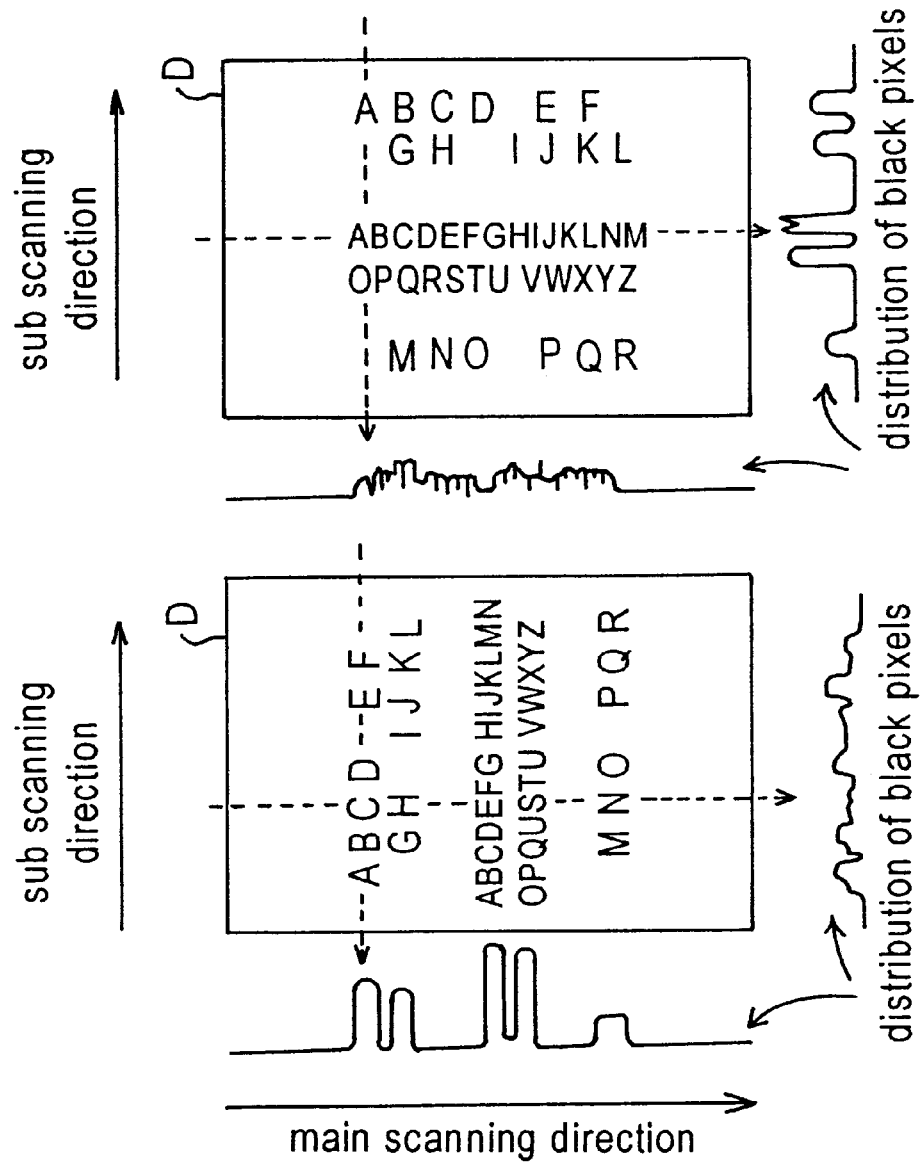

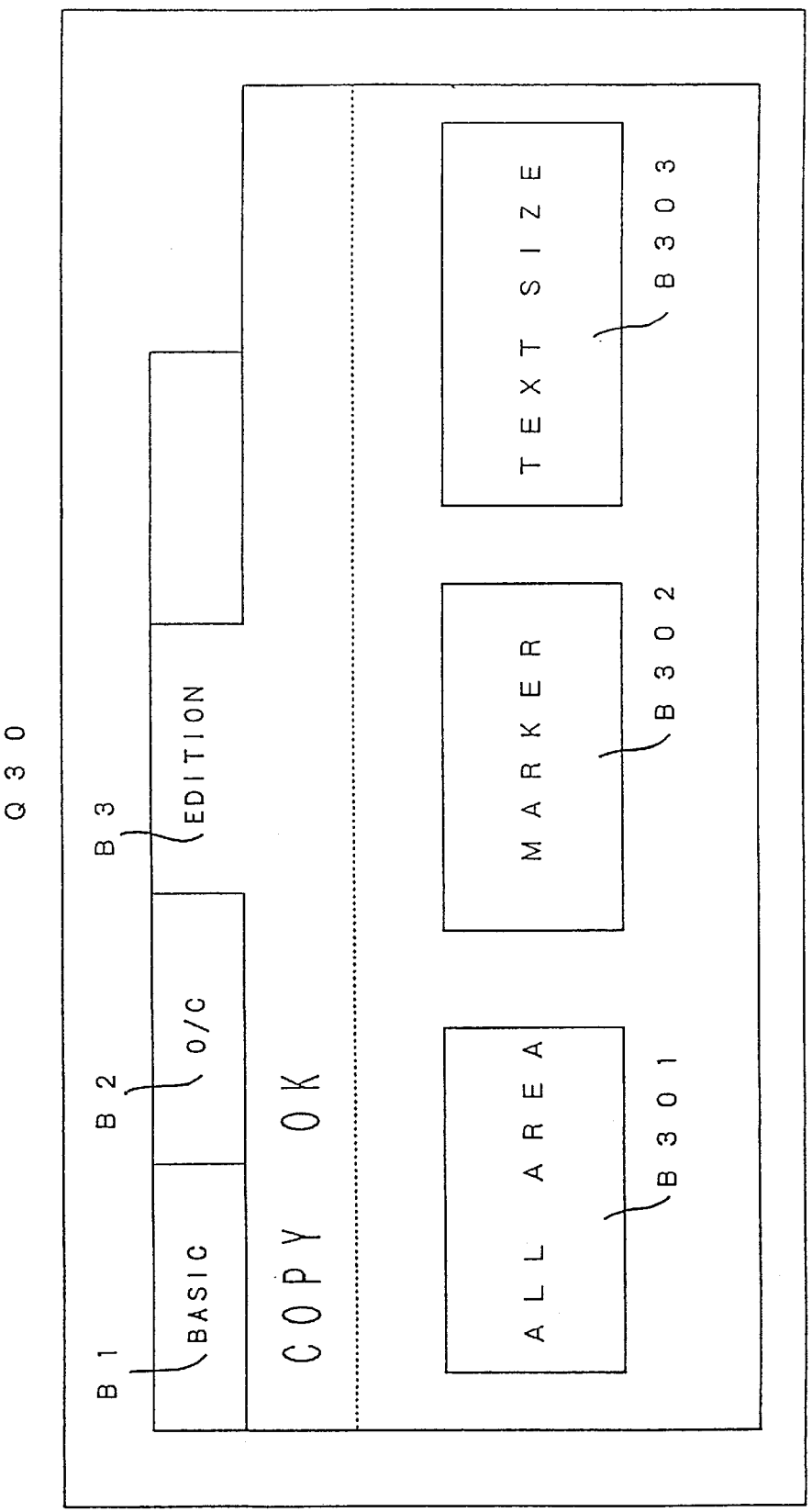

IMAGE EDITING APPARATUS

BACKGROUND OF THE INVENTION

The present invention relates to an image editing apparatus for editing image data, and specifically relates to an image editing apparatus suitable for editing functions of digital copying apparatuses and the like.

Digital copying apparatuses generally have editing functions for printing edited copy images of original documents. Editing processes include, for example, image halftone processes which overlay images, e.g., overlay fine dots over text, image highlighting processes such as black/white reversal (positive/negative reversal), masking processes which erase an image within specified areas, and trimming processes which print only images within specified areas.

Methods of specifying the editing region without coordinate numerical input from an operation panel include methods of region specification using special color marker pens. Copying apparatuses set editing regions by detecting regions circumscribed by marker pens via color discrimination, and setting said discriminated areas as editing regions.

Copying apparatuses are known which are capable of recognizing regions circumscribed by frame lines within a document image as editing regions (e.g., Japanese laid-open Patent Application No. HEI 5-14703).

When editing an image recorded on a document so as to create a new image, there is demand to specify the size of the image, e.g., the size of character. Consider, for example, editing to enlarge small text for easier visibility, and highlighting text of a document header which is larger than other text. Entries made in small text are often color-highlighted or underlined.

Conventionally, it is necessary for a user to select a specific size image (e.g., character and text string) and the region containing said image by marking an area on a document using marker pen, or circumscribing a selected image with frame lines. Therefore, when specified images are scattered in multiple locations, it becomes problematic to specify the editing regions. Furthermore, different editing features cannot be performed for editing regions of different sizes, respectively.

When it is undesirable to deface an original document using the marker pen method, the document first must be copied to create a separate document which can then be defaced using a marking pen. That is, creation of two documents aggravates the problem of editing costs. In methods which specify editing regions by circumscribing a region in a document with frame lines beforehand, the image to be edited must be contained within the frame lines, which is difficult to do when creating a document using screen editing functions of word processors and the like.

SUMMARY OF THE INVENTION

An object of the present invention is to eliminate the previously described disadvantages.

Another object of the present invention is to provide an image editing apparatus capable of producing a new image for editing as an image of specific size within a document without a troublesome region specifying operation.

To accomplish the objects described above, the present invention provides an image editing apparatus, which edits image having a plurality of line image along to a predetermined direction, comprising an extraction means for extracting a line image having a predetermined size, and an editing process means for executing an editing process for said line image extracted by said extraction means.

The present invention further provides an image editing apparatus, which edits text image having a plurality of character line image along to a predetermined direction, comprising a scanner which reads text image, a histogram generating means for generating histograms expressing the distribution characteristics of said text image read by said scanner, a detection means for detecting a line direction and a column direction of said text image from said histogram and extracting first character line image having a first predetermined size and second character line image having a second predetermined size, said first predetermined size being different from said second predetermined size, and an editing process means for executing a first editing process for said first character line image and a second editing process for said second character line image, said first editing process being different from said second editing process.

The present invention further provides an image editing apparatus, which edits text image having a plurality of line image along to a predetermined direction, comprising a scanner for reading text image, a histogram generating means for generating histograms expressing the distribution characteristics of said text image read by said scanner, a detection means for detecting a line and column direction of said text image based on said histogram and extracting minimum rectangle containing a entire line image of image data having a predetermined size, and an editing process means for executing an editing process for said entire line image containing in said minimum rectangle.

The present invention further provides an image editing apparatus, which edits text image data having a plurality of character line image along to a predetermined direction, comprising, a scanner which reads a document having a plurality number of text image, a histogram generating means for generating histograms expressing the distribution characteristics of said text image read by said scanner and extracting minimum rectangles containing for each character line image, a detection means for detecting first rectangle corresponding to a first predetermined size and second rectangle corresponding to a second predetermined size, said first predetermined size being different from said second predetermined size, and an editing process means for executing a first editing process for image data in said first rectangle and a second editing process for image data in said second rectangle, said first editing process being different from said second editing process.

BRIEF DESCRIPTION OF THE DRAWINGS

In the following description, like parts are designated by like reference numbers throughout the several drawings.

FIG. 6 illustrates the data construction of the editing table;

FIG. 7 illustrates the data construction of the document management table;

FIG. 8 is a modal illustration of the text document direction discrimination;

FIG. 10 illustrates the display content of the operation screen;

DETAILED DESCRIPTION OF THE INVENTION

Figure 1:
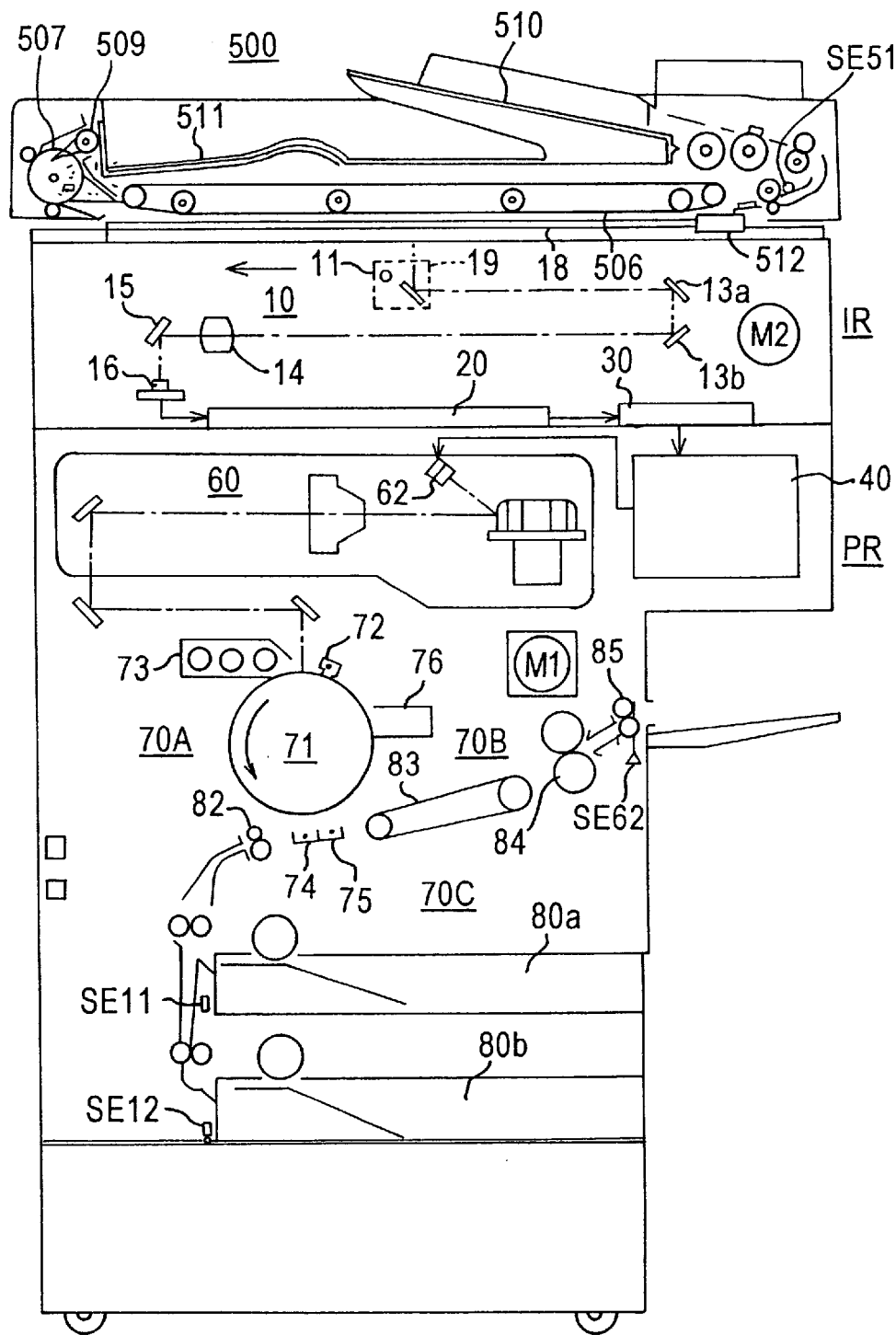
FIG. 1 shows the overall construction of a copying apparatus application of the present invention.

FIG. 1 shows the overall construction of copying apparatus 1 using the present invention.

A copying apparatus 1 is a digital type copying apparatus comprising an image reader unit IR, a page printer unit PR, and an auto document feeder (ADF) 500. Although not shown in the drawing, an operation panel OP (shown in FIG. 2) is also provided above the image reader unit IR. The operation panel OP is discussed later.

The image reader unit IR comprises a scanning unit 10 for optically reading the image of a document placed on a document glass 18, an image processing unit 20 for quantizing photoelectric conversion signals output by said scanning unit 10 and accomplishing various data processing, and a memory unit 30 for storing image data corresponding to said document.

The scanning unit 10 is an image reading device of the line scanning type comprising a scanner 19 with attached a document illumination lamp 11, mirrors 13a and 13b, a condenser lens 14, mirror 15, a charge-coupled device (CCD) unidimensional image sensor 16, and scanning motor M2 for driving scanner 19. The document is scanned in a main scanning direction by the image sensor 16, and scanned in a subscanning direction by moving the scanner 19 at constant speed. An image information read by the scanning unit 10 is transmitted to a memory unit 30 after being subjected to predetermined processing including image quality correction by the image processing unit 20. The memory unit 30 is described later.

The page printer unit PR is identical to the image forming device of a well known electrophotographic type comprising a print processing unit 40, a printhead 60 having a semiconductor laser 62 as a light source, a developing/transfer unit 70A having a photosensitive drum 71 as a latent image carrying member, a fixing/discharge unit 70B having pair of fixing rollers 84 and discharge roller 85, and a paper transport unit 70C having various rollers and a transport belt 83. The print processing unit 40 controls the printhead 60 based on the image data transmitted from the memory unit 30.

Around the periphery of the photosensitive drum 71 sequentially from the upstream side in the direction of drum rotation are arranged a charger 72, a developing device 73, a transfer charger 74, a separation charger 75, and a cleaner 76. The developing device 73 accommodates a two-component developer comprising black toner and a carrier.

Two paper cassettes 80a and 80b capable of accommodating several hundred sheets of paper are provided at the bottom inside the housing of page printing unit PR. The paper cassettes 80a and 80b are provided with paper size sensors SE11 and SE12.

The ADF 500 transports documents placed in a document feed tray 510 onto the document glass 18 via a transport belt 506, and after the document is read, ejects said read document onto a document discharge tray 511 via a discharge roller 509.

When, for example, copies are made of a plurality of document sheets, the user stacks said documents with the front surface (image surface) of said documents facing upward. When either one-sided copies or duplex copies are selected, each document placed on the document feed tray 510 is pulled from the bottom of the stack sheet, and accurately placed at a predetermined position on document glass 18 with the front surface of the document facing downward. In the case of one-sided copies, after the document is read, it is transported in a leftward direction in the drawing and discharged with the front surface of the document facing upward. In the case of duplex copies, after the front surface of the document is read, it is once transported in a leftward direction, and inverted front-to-back by an inversion roller 507, and returned to a predetermined position on the document glass 18. After the back surface is read, the document is discharged.

Figure 2:
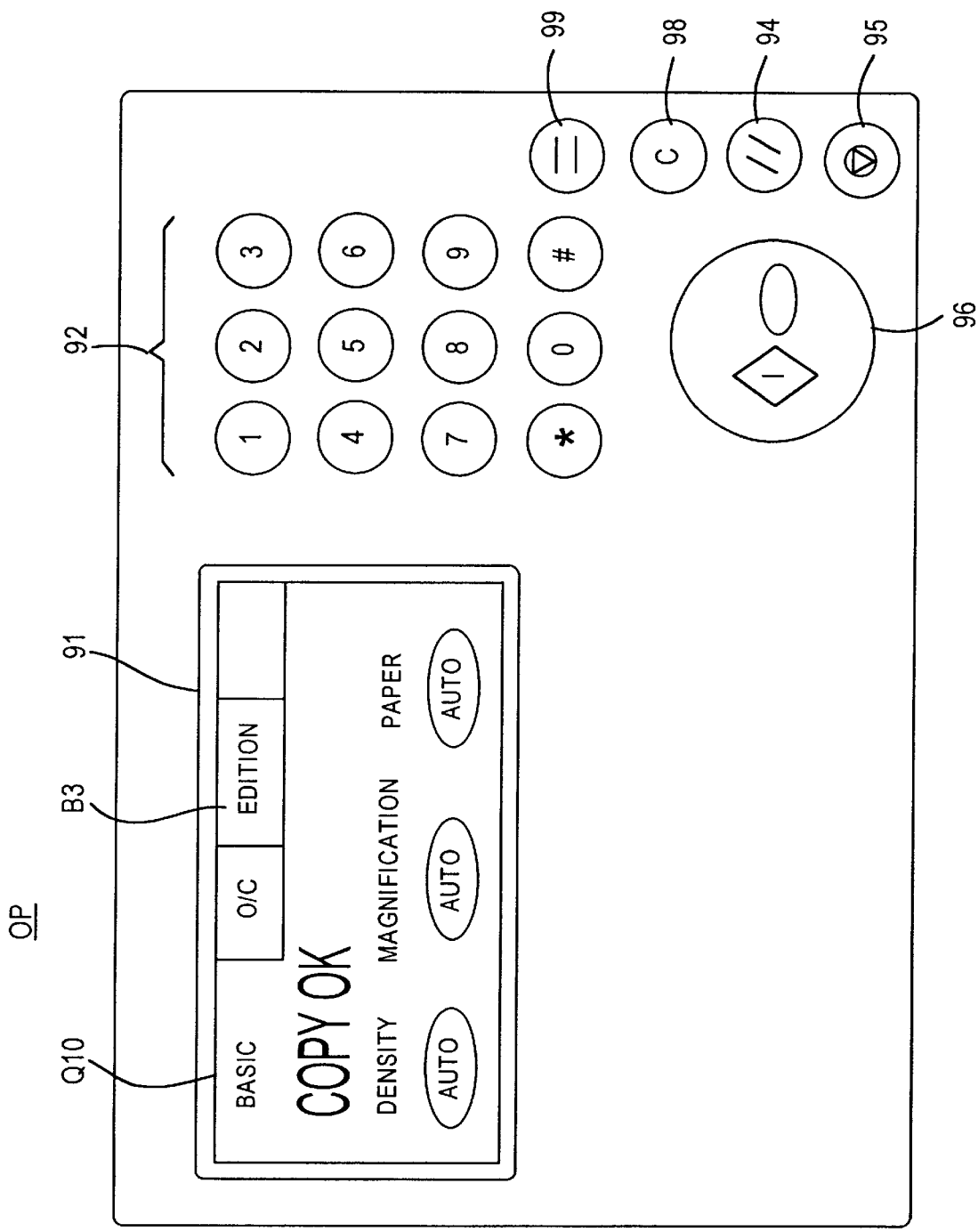
FIG. 2 is a top view showing the construction of the operation panel.

FIG. 2 is a top view showing the construction of the operation panel OP.

The operation panel OP is provided with a liquid crystal touch panel 91 for conversation mode operation, ten-key pad 92 for numerical input for number of copies, magnification and the like, a clear key 93 for initializing numerical input states, a panel reset key 94 for initializing all specification content, a stop key 95 for terminating a copy operation, a start key 96 for starting the copy operation, and an interrupt key 99 for setting the interrupt copy mode.

The liquid crystal touch panel 91 accomplishes various types of displays such as help messages, operation buttons, set states, abnormal conditions and the like. Operation modes corresponding to the operation menus of the aforesaid displays can be set by a user touching the operation displayed on the liquid crystal touch panel 91. Among the abnormal conditions of copying apparatus 1 are paper jams, paper empty, and conditions requiring a service call.

Figure 3:
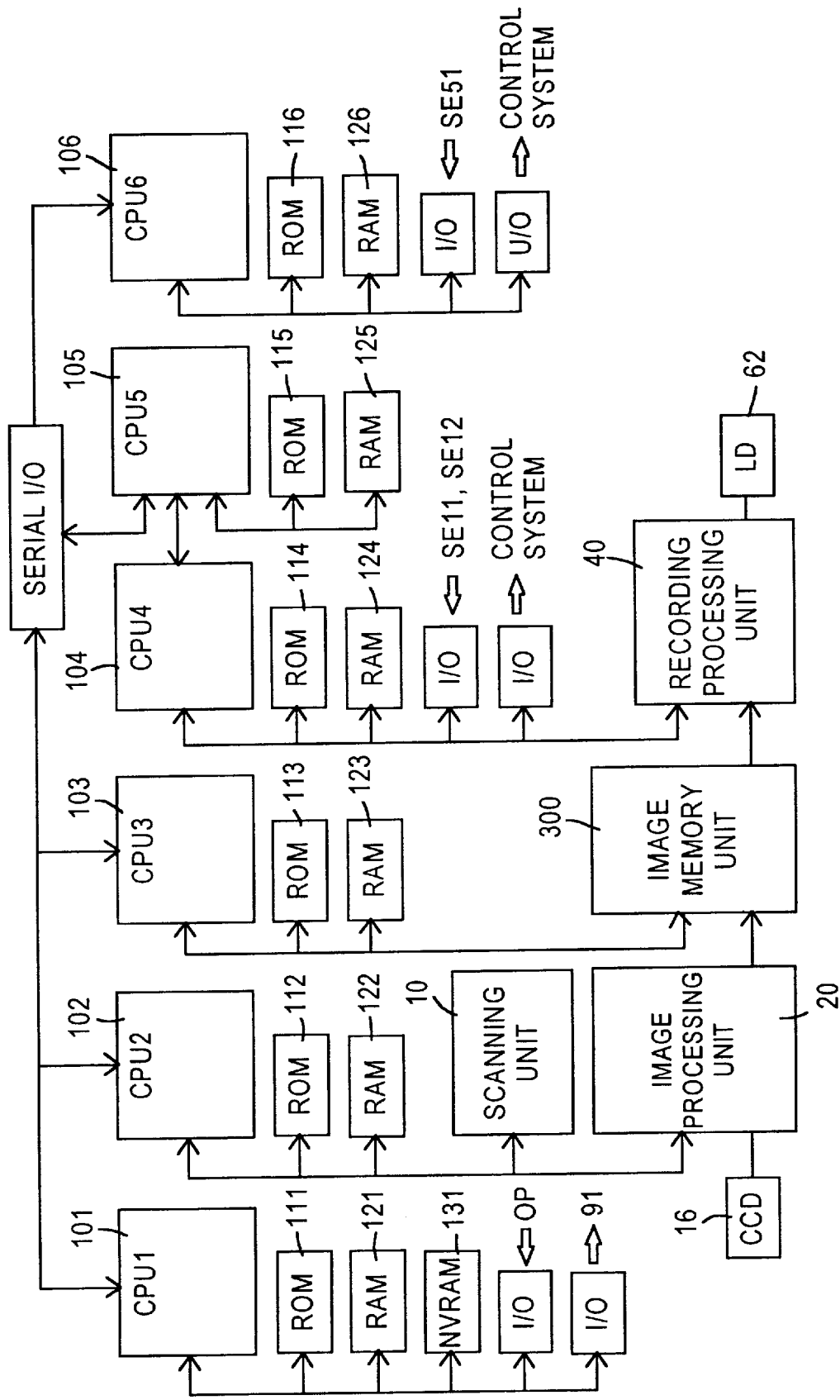
FIG. 3 is a block diagram showing the construction of the control section of the copying apparatus.

FIG. 3 is a block diagram showing the construction of control unit 100 of copying apparatus 1.

An control unit 100 is provided with six individual central processing units (CPU) 101 through 106, read only memories (ROM) 111 through 116 for storing the programs of said CPU 101 through 106, and random access memories (RAM) 121 through 126 used as work areas for the execution of said programs. Communication among the CPU in the control unit 100 is accomplished by an interrupt process format.

The first CPU 101 controls the operation panel OP. Cumulative information expressing the operational states such as display mode and copy mode recording information, editing condition recording information (editing table ET), total counter, and specific item counter and the like are stored in a nonvolatile RAM (NVRAM) 131.

The second CPU 102 executes drive control of the scanning unit 10, and control of the image processing unit 20. The third CPU 103 is built into the memory unit 30 and controls the image recording unit 300 described later. An document management table DT is stored in RAM 123.

The fourth CPU 104 receives the detecting signals from paper size sensors SE11 and SE12 via I/O ports.

The fifth CPU 105 is a controller executing overall control of the copying apparatus 1, and which regulates the timing of controls executed by the other CPU. That is, the fifth CPU 105 receives periodic reports indicating changes of state from the other CPU, and transmits commands suitable for the operating mode to said other CPU.

The sixth CPU 106 controls ADF 500. When a document is fed from the document feed tray 510 to a predetermined position on the document glass 18, the ON time of paper sensor SE 51 is timed by the sixth CPU 106, and the result is transmitted to the fifth CPU 105 as information indicating the document size. The fifth CPU 105 instructs the third CPU 103 to generate a document management table DT which incorporates said document size information.

Figure 4:
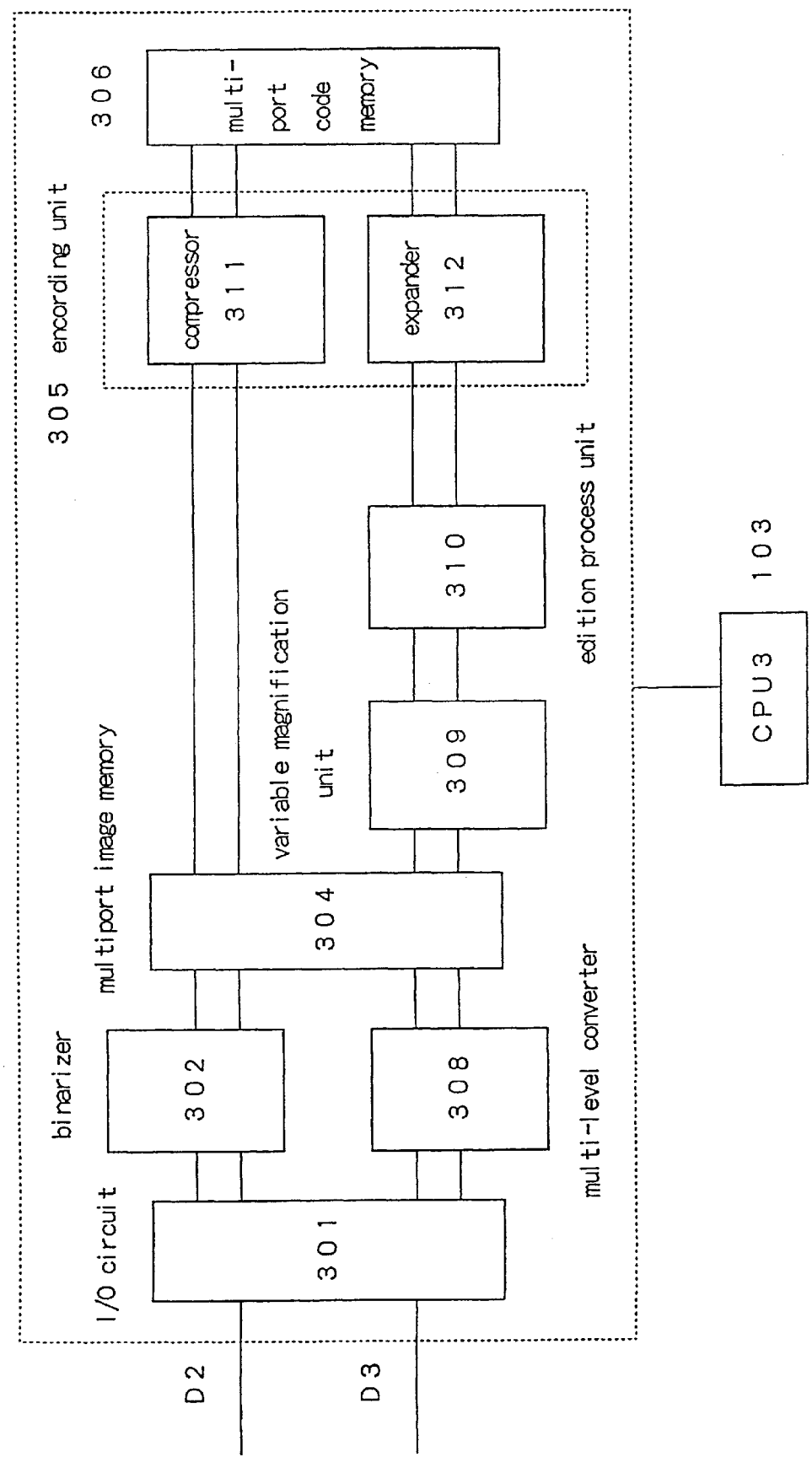
FIG. 4 is a block diagram of the memory unit.

FIG. 4 is a block diagram of the memory unit 30.

The memory unit 30 comprises an image memory unit 300 and the third CPU 103 which controls said image memory unit 300.

The image memory unit 300 comprises an I/O circuit 301, a binarizer 302, a multiport image memory 304, an encoding unit 305 provided with a compressor 311 and an expander 312, a multiport code memory 306, an editing process unit 310, a variable magnification unit 309, and a multi-level converter 308, and is constructed so as to be capable of compressing and storing image information. The compressor 311 and the expander 312 are constructed for parallel and mutually independent operation to improve copying speed, and data transfers between the compressor and the expander and the code memory 306 are accomplished by a direct memory access method.

The memory unit 30 received 8-bit image data D2 input from the image processing unit 20. Image data D2 are transmitted to the binarizer 302 the via I/O circuit 301.

The binarizer 302 converts the multi-level image data D2 to binary image data within a restorable range via a tone reproduction method such as the dithering method. The binarized image data is once written to the image memory 304. The image memory 304 has a capacity capable of storing image data (400 dpi resolution) of one A3 size page.

The encoding unit 305 reads the image data written to the image memory 304, and compresses said image data to generate code data (compressed data), which are then written to the code memory 306. The encoding unit 305 reads out the code data written in the code memory 306 and expands said code data in accordance with instructions from the third CPU 103, and transmits said expanded data to the editing unit 310.

In the editing unit 310, image data are edited in accordance with the size of the image, and subsequently said image data are duplicated or culled in accordance with copy magnification in the variable magnification unit 309.

Thus, image data subjected to the editing process and variable magnification process are written to the image memory 304 so as to virtually write a reproduced image of one page in the image memory 304. When printing the desired images of a plurality of documents on a single copy sheet, the image data of the images to be printed are read out from the code memory 306, so as to combine the desired images in the image memory 304.

When the one-page virtual image is completed, binary image data are read from the image memory 304, and restored to 8-bit image data by the multi-level converter 308. The restored data are transmitted as image data D3 to the printing unit 40 via I/O circuit 301, and used to generate modulation signals for the semiconductor laser 62. When making copies using a plurality of copy sheets, image data are read out from the image memory 304, and in parallel therewith image data corresponding to a subsequent page are used to create the virtual image.

As described above, information relating to a plurality of documents can be stored in a relative small capacity memory (code memory 306) by temporarily binarizing image information, thereby allowing combined editing of desired images of a plurality of documents.

The copying apparatus 1 is provided with a management table MT within RAM 123 which is used for timely demonic management of the code memory 306. That is, when storing image information, the third CPU 103 stores the information required by management table MT, controls the compressor 311, and sequentially writes code data to the code memory 306. When outputting image information, code data read out from the code memory 306 in an operation opposite of the operation for storing data.

FIG. 5 illustrates the relationship between the management table MT and the code memory 306.

The code memory 306 is divided into memory areas of 32 Kilo-byte units. In order to simplify parallel processing of writing and reading, only code data corresponding to a single page are stored said memory areas.

On the other hand, the management table MT stores the number of each memory area of the code memory 306, the page number of the original document, the number of linked areas, and various other types of added information.

Figures 5A, 5B:
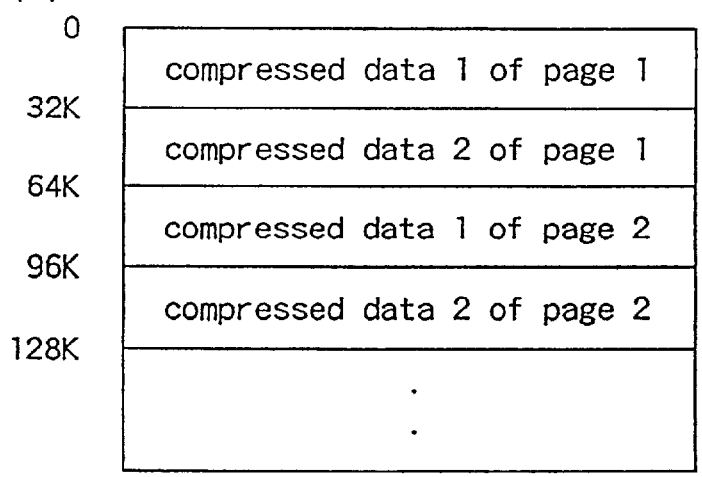
FIG. 5 illustrates the relationship between the management table and the code memory.

For example, consider area number [00] in FIG. 5(a); since the page number is [1], it can be understood that the stored information pertains to the first page. Since the [prior linked] data are [00], it can be understood that the number [00] is the area of the first page contains information of one page. Since the [post linked] data are [01], it can be understood that information of one page is contained in the memory area number [01]. If the post linked data is [FF] expressing the terminus, subsequent memory areas do not contain one-page data.

The added information in the management table MT includes data (document management table DT of FIG. 7) for editing character size which is fully described later. The information of management table MT is erased after a time sufficient for reading the corresponding page image data from the code memory 306 only a number of times specified by the copy job.

The copying apparatus 1 having the construction described above is provided with an editing function added to processes relating to the size of images read from an original document. "Image" in this case refers an image having a color other than the background color of the document. In the case of a character document, for example, the individual characters are the image. "Size" refers to the size of the image, i.e., the size of the minimum rectangle circumscribing the image.

This editing function is particularly suitable for editing text images, although it is not limited to a specific type of image (e.g., text, line art, photographic image). Therefore, in the present invention, editing of text images is referred to as "text size editing."

When a user selects text size editing by the predetermined operation so as to set the editing condition, it is possible, for example, to highlight part of a passage (halftone, black/white inversion and the like), or move the character string. Furthermore, it is possible to print a table of contents by extracting headers within passages of one-page or multi page documents and printing only said header information.

In text size editing, an editing table ET expressing the editing conditions set by a user is generated by the first CPU 101 and stored in RAM 121. Furthermore, the document management table DT expressing the editing region within the document is generated by the third CPU 103 and stored in RAM 123.

FIG. 6 shows the data structure of the editing table ET, and FIG. 7 shows the data structure of the document management table DT.

Data items of the editing table ET include a region class, a text size, table of contents conditions, and edit contents. FIG. 6(a) shows data content when the text is highlighted in accordance with the text size without generating the table of contents; FIG. 6(b) shows data content when generating hierarchical format table of contents; FIG. 6(c) shows data content when generating parallel format table of contents. The operation and data content of editing table ET are described later.

When the document management table DT stores document dimensions, and coordinates of the starting point and ending point of the editing region within a page for each page (document). Document dimensions may use settings such as counting the number of pixels, and virtual image starting position to extract an edit region.

Figure 19:
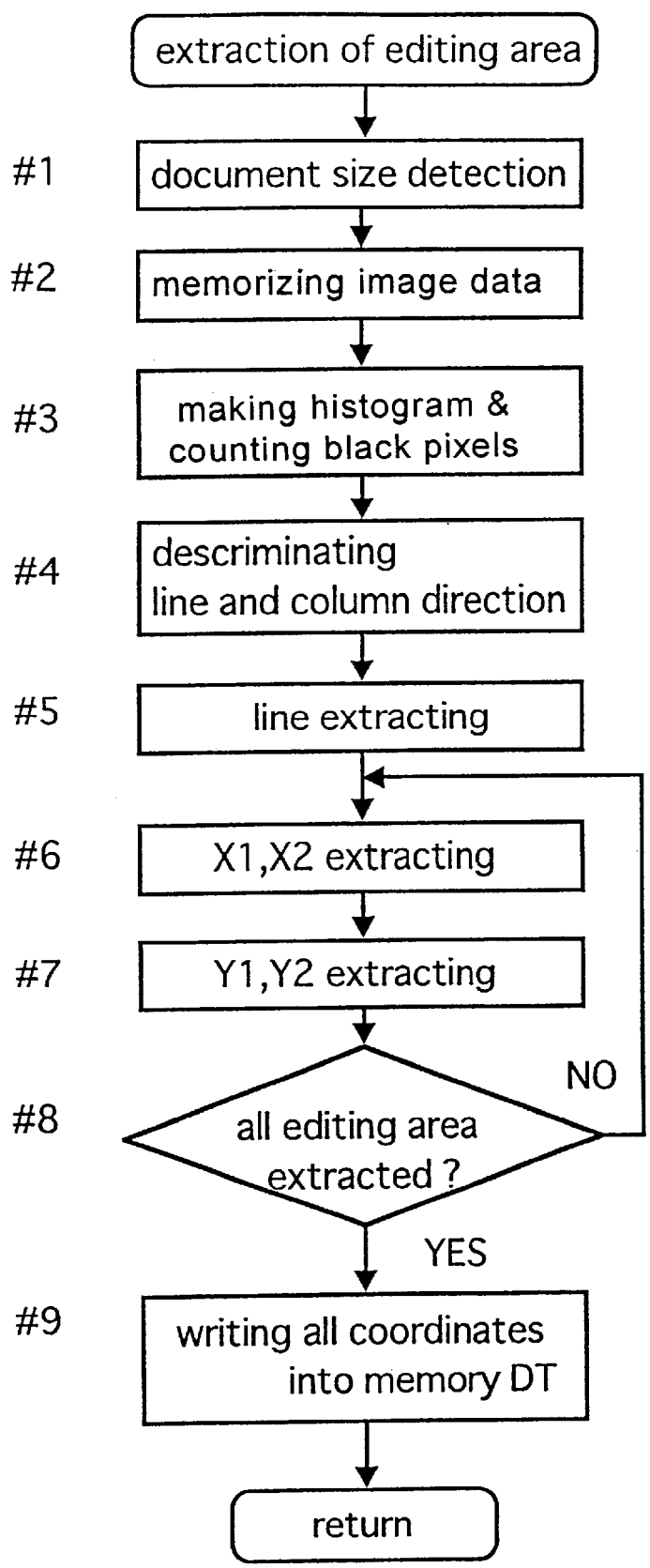
FIG. 19 is a flow chart showing the extraction of the editing region in character size editing.

FIG. 19 is a flow chart showing the algorithm for extracting an editing region in text size editing mode. FIG. 8 illustrates text document direction discrimination, and FIG. 9 illustrates region extraction.

First, the document size is detected by the size sensor SE5 of the ADF 500, and the detected document dimensions are written to the document management table DT (#1). In the document management table DT of FIG. 7, the size of each page 1 through 5 of a five-page document is A4, such the dimension of each page in the main scanning direction X is [297 mm], and the dimension of each page in the subscanning direction Y is [210 mm], and said data are stored in the table DT.

Furthermore, means for detecting document size may also detect document size by providing photoemitter and photoreceptor elements below the document glass 18 so as to illuminate a document with light emitted by said photoemitter element and receive the light reflected from the illuminated document via said photoreceptor element.

Following the detection of document size, image data read from the document are stored in the memory unit 30 (#2). Region extraction is accomplished based on the image data stored in the memory unit 30, as described below. Steps #3 through #9 are executed by the third CPU 103.

The black pixels are counted in each scan line in the main scanning direction, and a check is made of the distribution of black pixels in the subscanning direction of the document. Furthermore, black pixels are counted in each scan line in the subscanning direction, and a check is made of the distribution of black pixels in the main scanning direction of the document (#3). Black pixels are pixels comprising an image, and correspond to the area other than the background region of the document. Histograms are generated to express the distribution of black pixels in both the main scanning direction and the subscanning direction, as shown in (A) and (B) of FIG. 8, and the line direction and column direction of the document are discriminated based on said histograms (#4). The line direction is the arrangement direction of the text comprising the document. The column direction is a direction perpendicular to the line direction.

In the example of (A) of FIG. 8, the document D is an A4 size document, and the lengthwise direction of the document sheet matches the main scanning direction. When focusing on the distribution of black pixels in the main scanning direction, the intersection of areas having a majority of black pixels and areas completely lacking pixels becomes apparent, and the areas completely lacking black pixels are relatively longer. In contrast, there is no discernable rule apparent in the distribution of black pixels in the subscanning direction. From this observation it can be inferred that the line direction in the document D is in the subscanning direction. That is, the document D is discriminated as a document with horizontal text in a portrait format, or a document with vertical text in a landscape format.

In the example of (B) of FIG. 8, the document D is an A4 size document, and the lengthwise direction of the document sheet matches the main scanning direction. In this example, however, the characteristics of the distribution of black pixels is opposite of the example in (A) of FIG. 8. Accordingly, the line direction can be inferred to be the main scanning direction. That is, document D of (B) of FIG. 8 is discriminated as a document with horizontal text in a landscape format, or a document with vertical text in a portrait format. Portrait format and landscape format can be discriminated by detailed typing via the distribution of black pixels.

When the line direction and the column direction are discriminated via histogram as previously described, each line can be sliced. That is, lines and line spacing can be discriminated (#5). At this time, the dimensions of text of each line in the column direction can be determined. Thus, text size (i.e., size of the image) can be specified from said dimension in the column direction.

Figure 9A:
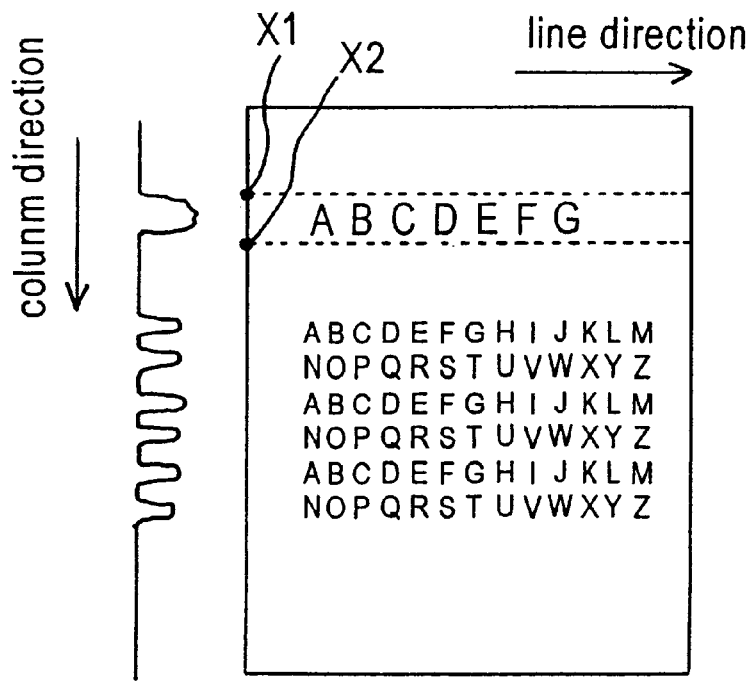
FIG. 9 illustrates region extraction.
Figure 9B:
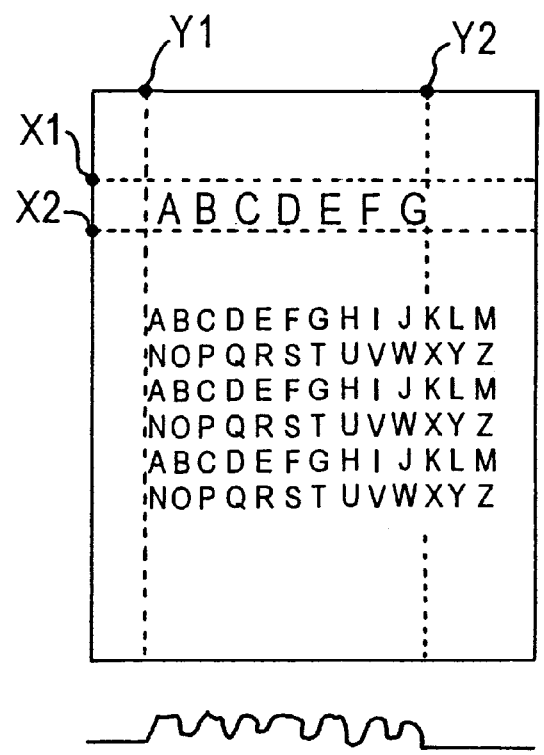

Within a sliced line, a line of a size matching a first character size recorded in the editing table ET beforehand by a user is extracted, and the coordinates X1, X2 (refer to FIG. 9(a)) at bilateral ends of the extracted line in the column direction are detected (#6). As shown in (b) of FIG. 9, the distribution of black pixels in the line direction of the extracted line is determined, and the range of the image within the line is determined based on said distribution (#7). That is, coordinates Y1, Y2 of bilateral ends of one editing region in the line direction are detected. At this time, the size of one editing region is specified, i.e., the region circumscribed by the four coordinates X1, X2, and Y1, Y2 is specified as the editing region. Even when a plurality of characters of different sizes are present within the same line, characters of different sizes can be discriminated from the distribution of black pixels in the line direction, so as to discriminate an editing region from other regions.

Coordinates X1, X2, and Y1, Y2 are detected for all lines of a size matching a first character size of the editing table ET, and when all editing region have been extracted (#8: YES), the starting coordinates (X1, Y1) and ending coordinates (X2, Y2) of all editing regions are written to the document management table DT (#9).

Figure 20:
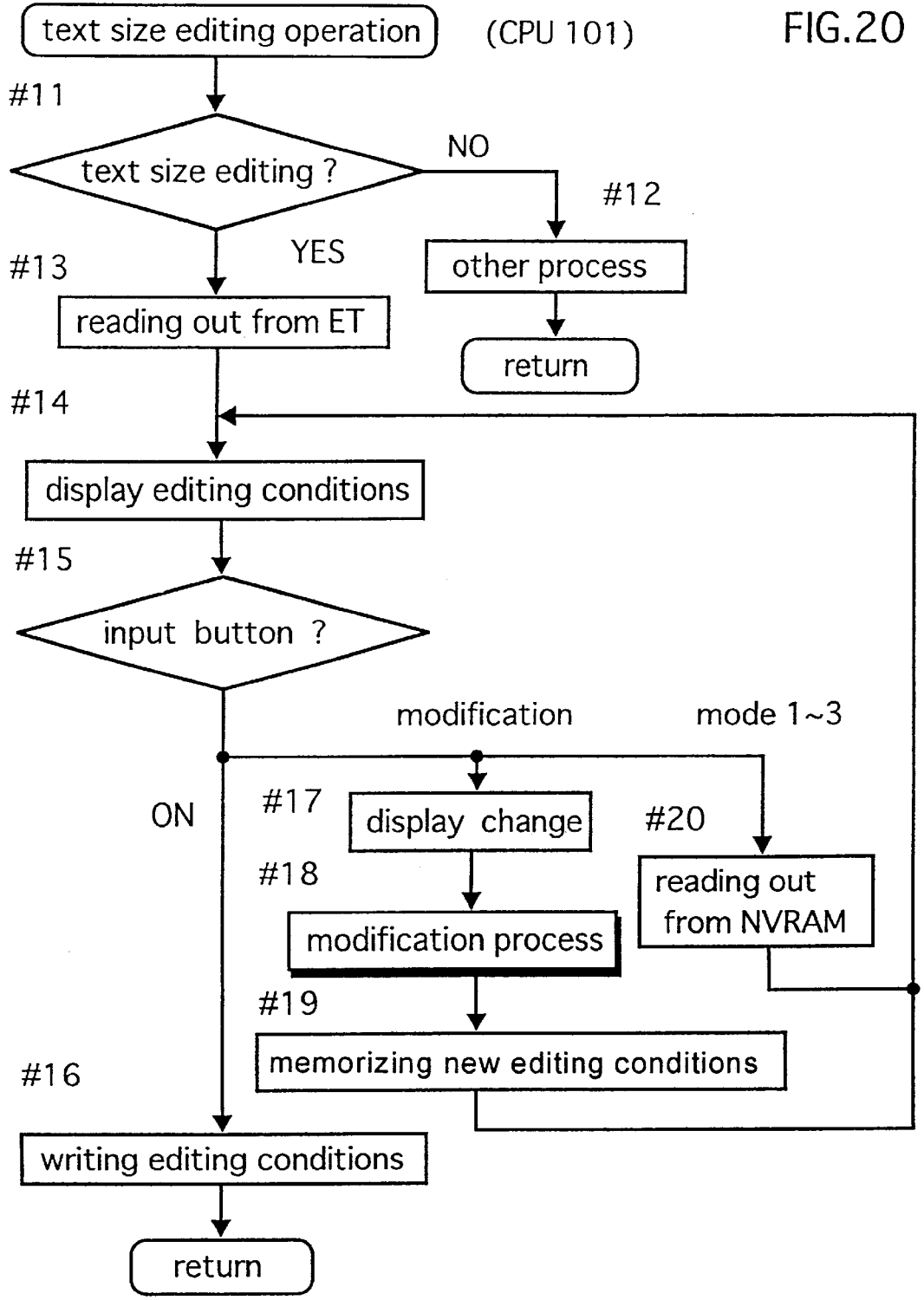
FIG. 20 is a flow chart of the operational process of character size editing executed by the third CPU.
Figure 21:
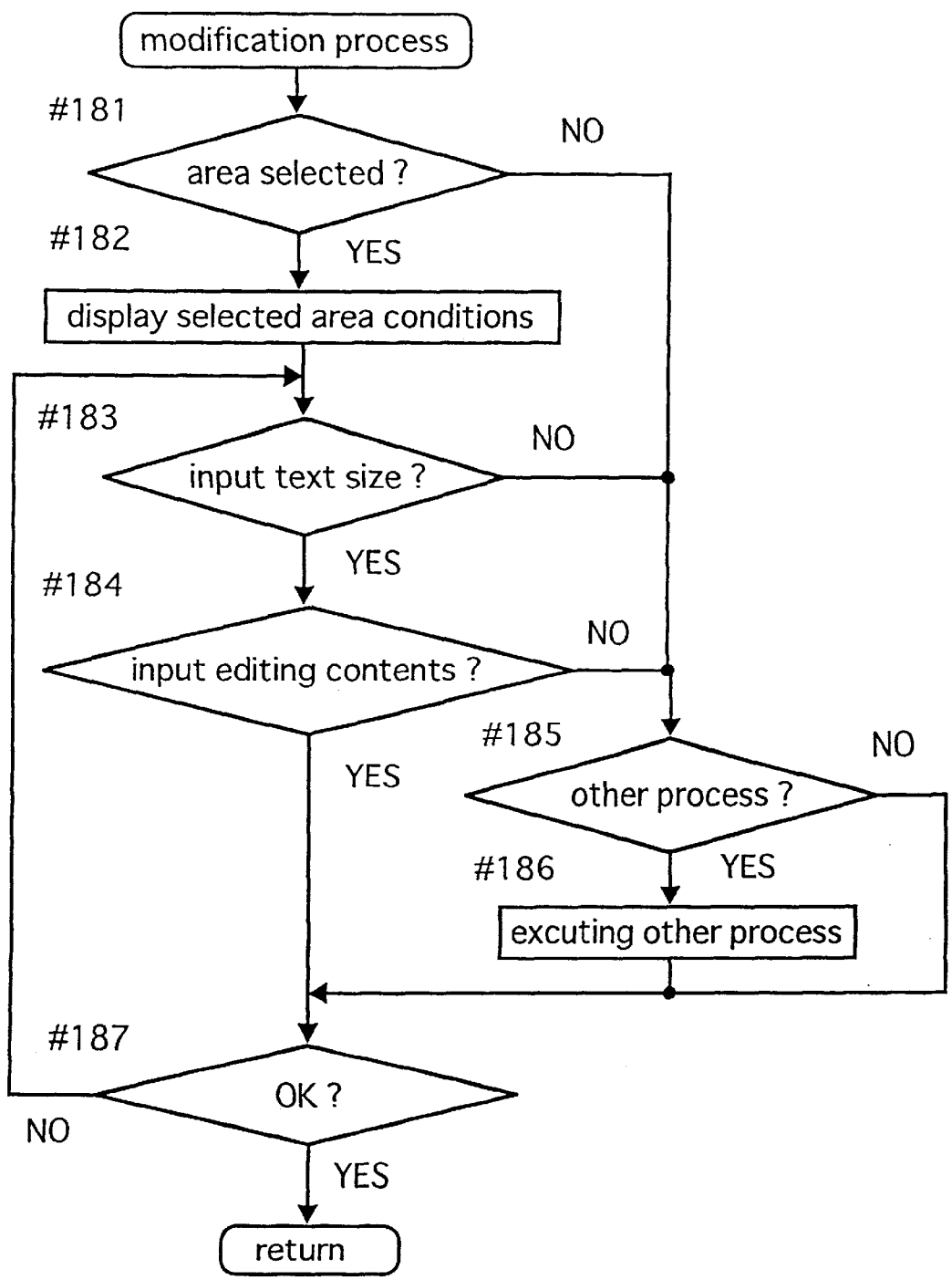
FIG. 21 is a flow chart of a modification of the process of FIG. 20.

FIG. 20 is a flow chart of the process of the text size editing operation executed by the first CPU 101. FIG. 21 is a flow chart of a modified process of step #18 of FIG. 20. FIGS. 10 through 14 show the display contents of the operation screen.

A basic screen Q10 shown in FIG. 2 is normally displayed on the liquid crystal touch panel 91. When a user touches the editing button B3 on basic screen Q10, the display changes to the editing menu screen Q30. In the editing menu screen Q30, a user can select one of three editing modes, i.e., [edit text size], [edit by marker], or [edit all]. Edit by marker is an editing mode which allows editing by predetermined settings or user-specified settings relative to an image in a marked region. Edit all is an editing mode which allows editing of an entire image.

Figure 11:
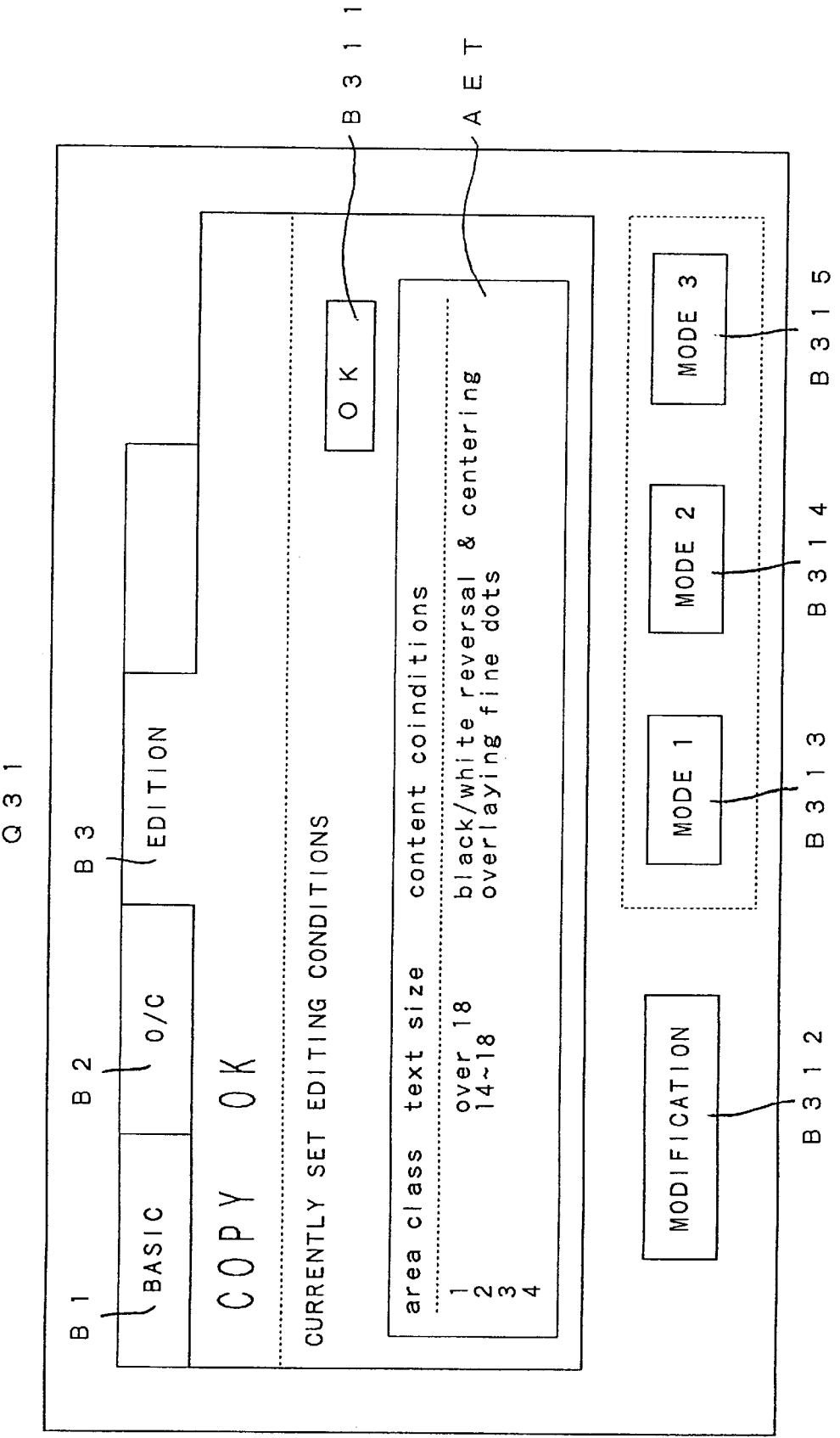
FIG. 11 through FIG. 14 illustrate the display content of the operation screen.

When a user selects the text size editing mode via button B303, the first CPU 101 reads the editing table ET from RAM 121 and displays edit settings screen Q31, as shown in FIG. 11 (refer to steps #11, #13, #14 of FIG. 20). The screen Q31 displays the settings of the editing table ET, i.e., has an area AET displaying the currently set editing conditions.

When another editing mode is selected by a user via buttons B301 or B302, other processes corresponding to the selected mode are executed (steps #11, #12).

When a user wants to edit under the conditions displayed in the area AET, the OK button B311 is turned ON. In this case, the current editing conditions are written directly to the editing table ET. That is, when editing conditions are modified in a manner described later, or previously recorded editing conditions are not fetched, the contents of the original editing table ET are maintained (#15, #16). Thereafter, copying apparatus 1 awaits a copy start command. The text size editing copy operation starts under the currently set editing conditions when a user presses start button 96 while the editing settings screen Q31 is displayed.

An operation calling up the recorded conditions is executed when a user wants to edit under previously the recorded editing conditions. Editing conditions may be of three recorded patterns, and may be implemented using three call buttons B313 through B315 corresponding to each pattern. When one button among said three button is selected, the editing conditions associated with said button are read out from NVRAM 131 (#20), and displayed in the area AET (#14). Furthermore, recording of editing conditions is not limited to three buttons inasmuch as two or fewer buttons, or four or more buttons may be used.

The modification button B312 is selected when a user wants to edit under conditions which differ from the editing conditions displayed in the area AET. When this operation is called, the display changes to the area selection screen Q32 shown in FIG. 12 (#17).

The first CPU 101 first executed the modification process for setting editing condition in accordance with the specified operation (#18), and the new editing conditions are written in the editing table ET (#19). Then, edit setting screen Q31 is again displayed.

In the modification process (steps #181 through #187) in FIG. 21, the first CPU 101 calls the operations of selection buttons B321 through B324 of area selection screen Q32, and displays the area modification screen corresponding to the selected button. For example, when selection button B321 is selected, area modification screen Q33 is displayed (refer to FIG. 13) to allow a user to set the editing contents and text size.

A user inputs the text point size using the ten-key pad 92. A selected text size is displayed in the area A331 in area modification screen Q33. The editing contents are specified by operation of the buttons in area A332 of area modification screen Q33. In the present invention, there are a possible eight selections of editing processes, e.g., halftone, black/white reversal, outlining, italics, bold, center, move, and delete. The halftone is a mode for printing an overlay of fine dots on an image. The black/white reversal is a mode for reversing the black pixels and white pixels for printing. The outlining is a mode the outline area by thickening for printing. The italics is a mode for printing a text image in italics. The bold is a mode for thickening the text of a text image for printing. The centering is a mode for shifting the position of an image to be printed to the center of a sheet for printing. The move is a mode for moving the position of an image to be printed. The delete is a mode for deleting an image. Although eight editing modes are provided in the aforesaid example, the present invention is not limited to eight editing modes inasmuch as fewer or more modes may be provided. Furthermore, the contents of the editing processes are not limited to those contents described above, and various other editing processes may be set. Text size point settings and editing content settings may be changed via the operation of the cancel button B332. The specified contents are set as the editing conditions when the OK button B331 is selected.

Figure 12:
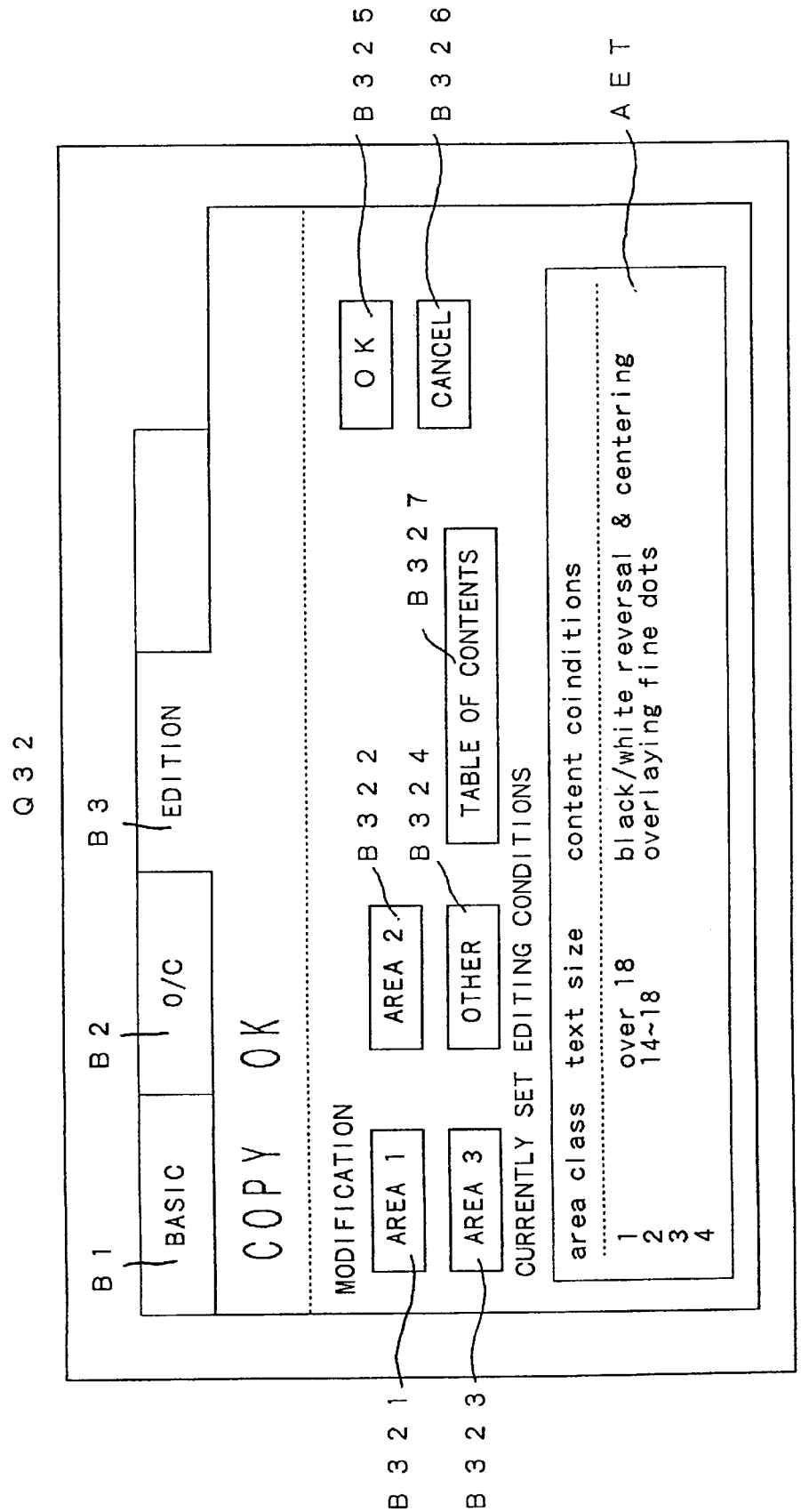
Figure 13:
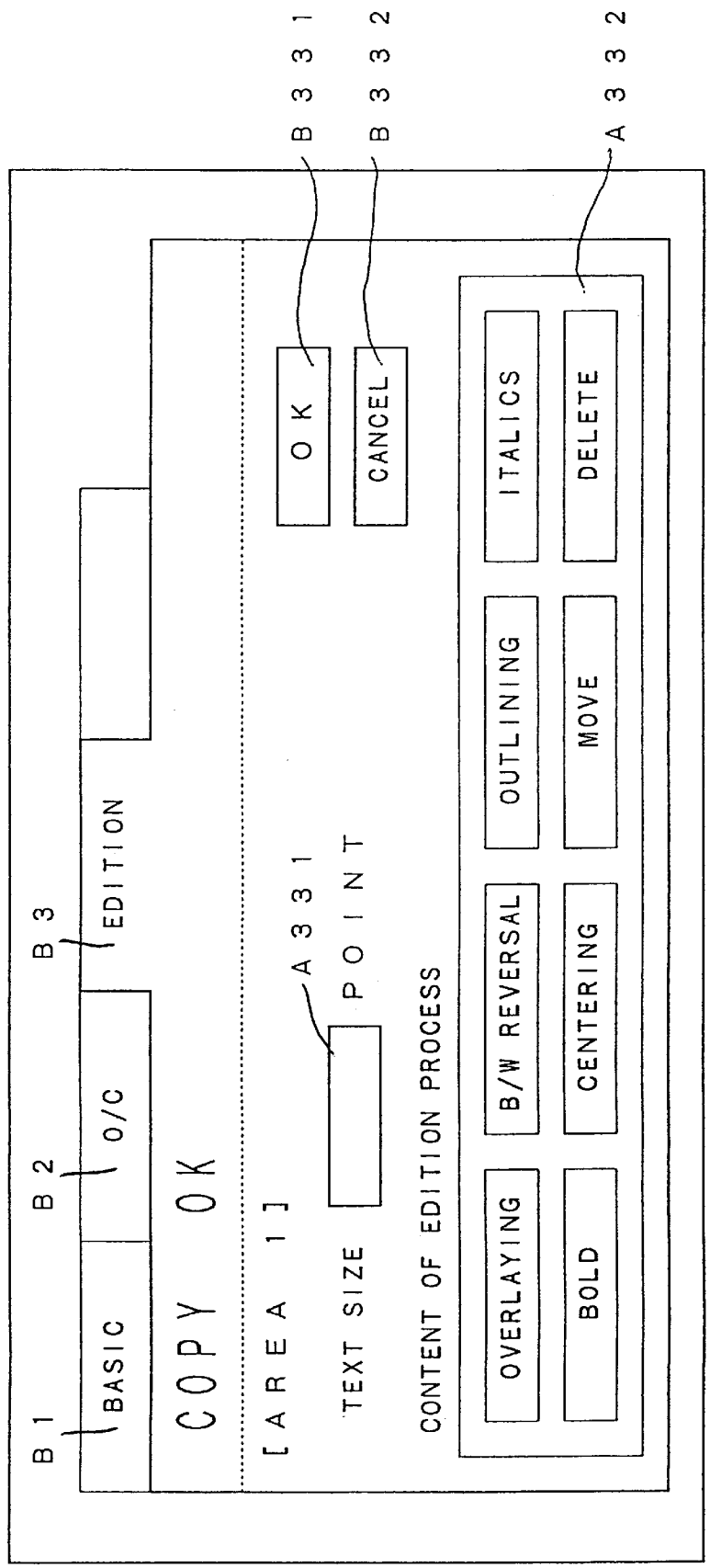
Figure 14:
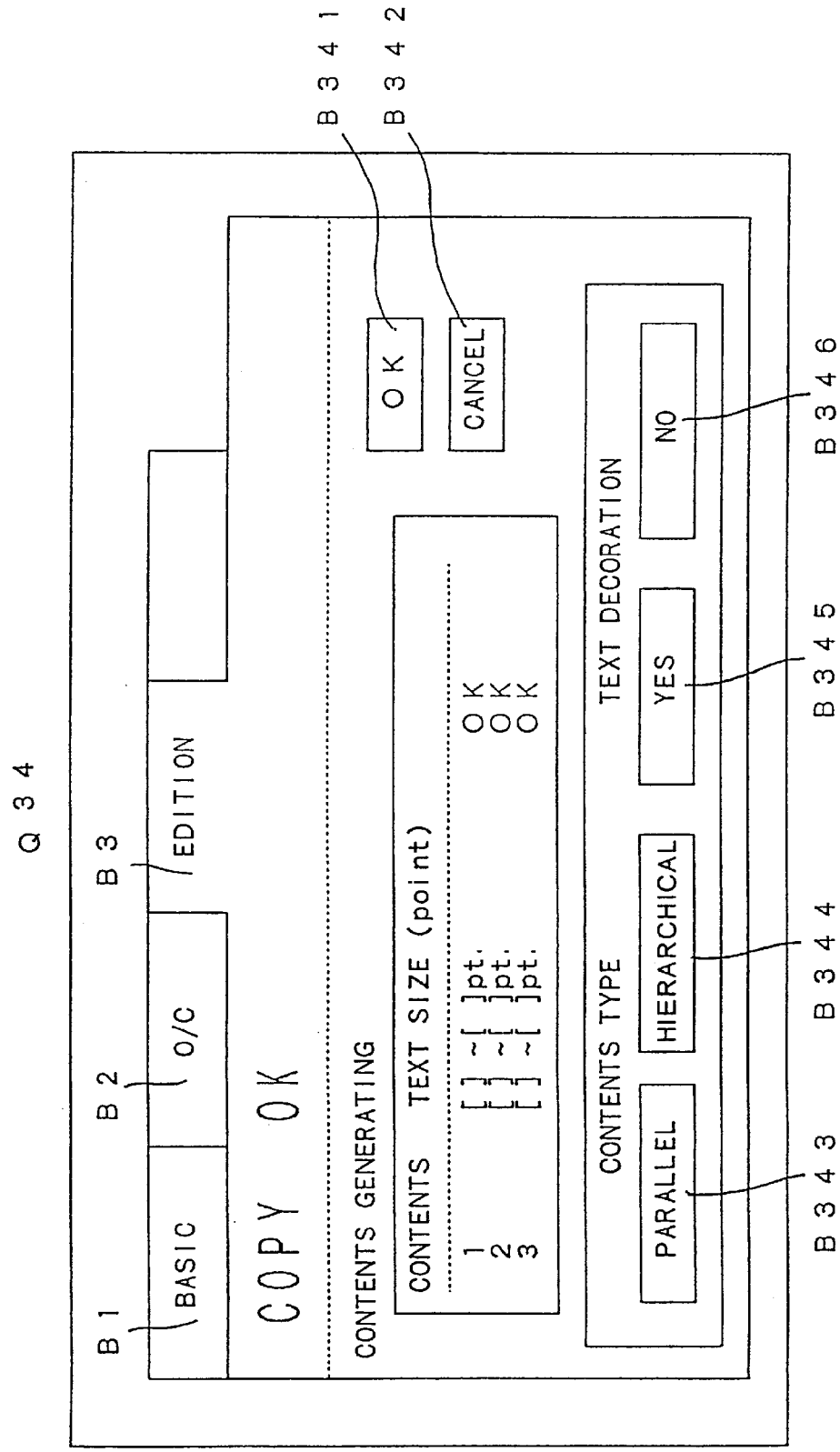

On the other hand, when table of contents button B327 is selected in area selection screen Q32 of FIG. 12, the table of contents setting screen Q34 of FIG. 14 is displayed.

In the present invention, table of contents can be generated having a maximum of three levels. That is, this function provides three levels of headers, i.e., main header (first level), mid header (second level), and minor header (third level), can be extracted from the text and arranged for printing.

It is to be noted that table of contents may be generates to four or more levels if desired.

In the table of contents setting screen Q34, the text size of header of each level, header layouts, and text decoration can be set. Header layouts may be parallel format wherein headers of all level are aligned, or hierarchical format with indent positions corresponding to the sequential levels of 1, 2, or 3.

Figure 22:
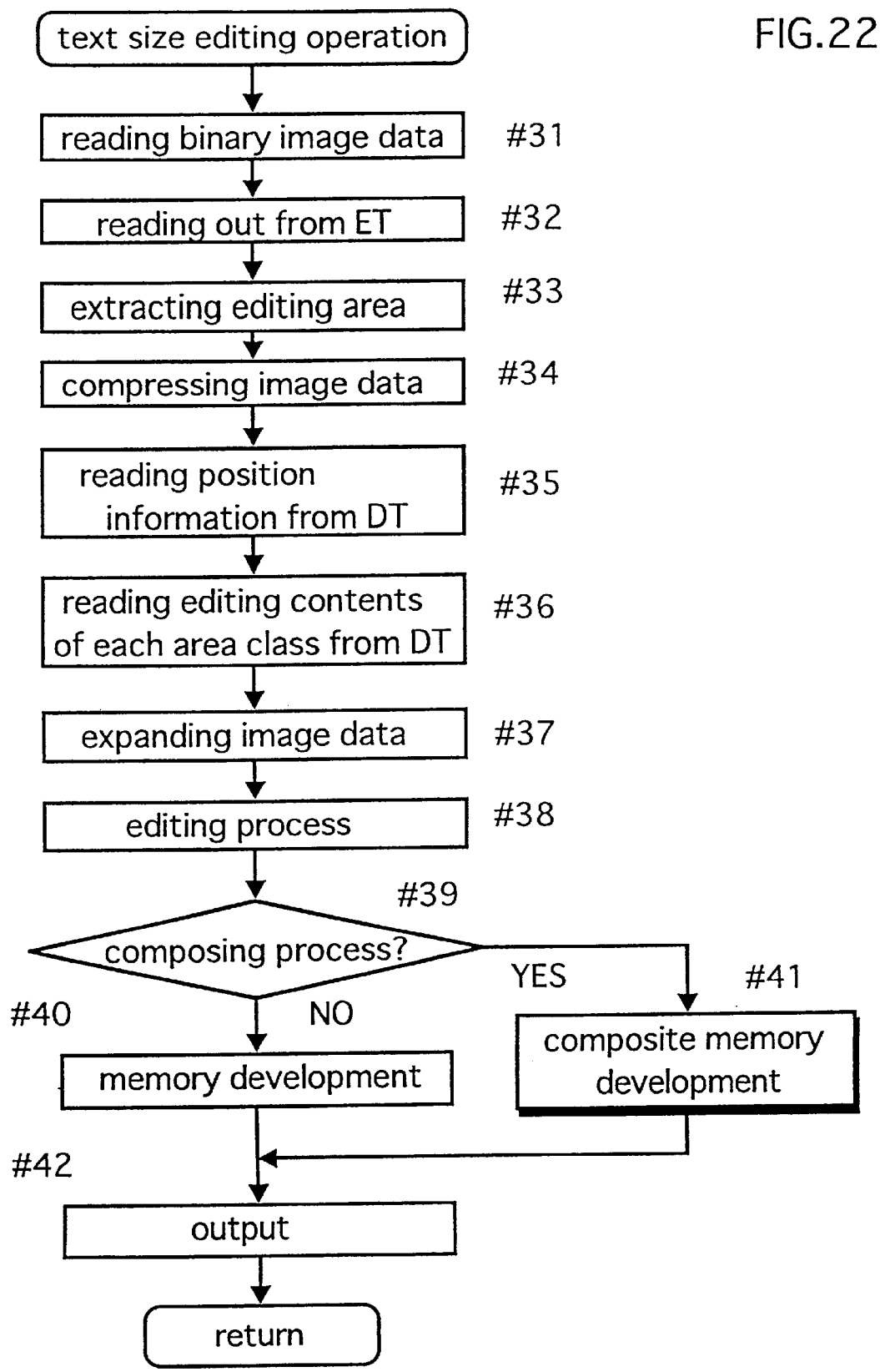
FIG. 22 is a flow chart showing the control operation of the third CPU in the character size editing mode.
Figure 23:
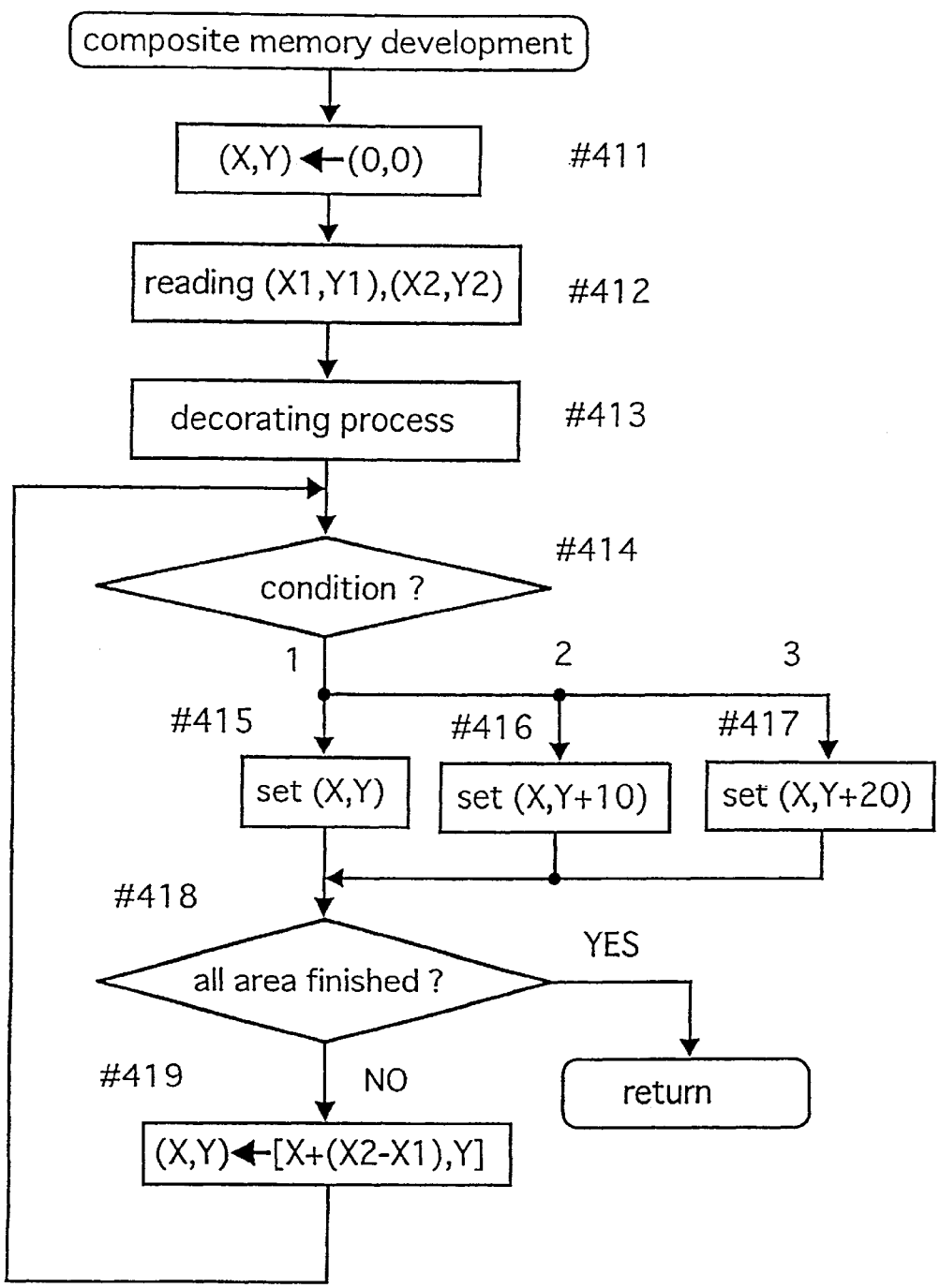
FIG. 23 is a flow chart of the composite memory development process of FIG. 22.

FIG. 22 is a flow chart showing the control operation of the third CPU 103 in the text size editing mode. FIG. 23 is a flow chart showing composite memory development of step #41 of FIG. 22.

When a user selects the start key 96 after editing conditions have been set, the first CPU 101 alerts the third CPU 103 via the fifth CPU 105, and document scanning starts via the second CPU 102. Read image information is transmitted through the image processing unit 20 to the memory unit 30. The third CPU 103 once writes the transmitted image data to the image memory 304 as previously described.

In the text size editing mode, the third CPU 103 reads binary image data from the image memory 304 (#31), and reads the editing table ET via communication with the first CPU 101 via the fifth CPU 105 (#32). A previously generated editing table ET may be transmitted from NVRAM 131 or RAM 121 to RAM 123.

Areas matching the set editing conditions (text size) are extracted from the read areas of a document based on the data stored in the image memory 304, and the coordinates of the extracted areas are written to the document management table DT (#33). That is, the positions of editing areas in the document are recorded. The area extraction accomplished in step #33 is accomplished using the algorithm of steps #3 through #9 of the previously described FIG. 19.

When area matching the editing conditions comprise a plurality of areas within a document, the aforesaid processes are executed relative to all said matching areas.

Then, the third CPU 103 compresses the image data of the document after editing areas have been extracted, and stores said image data in the code memory 306 (#34).

Next, position information of the areas previously extracted are read from the document management table DT (#35), the editing contents of each area class are read from editing table ET (#36), and thereafter the data of one page are read from the code memory 306 and expanded (#37).

Figure 15:
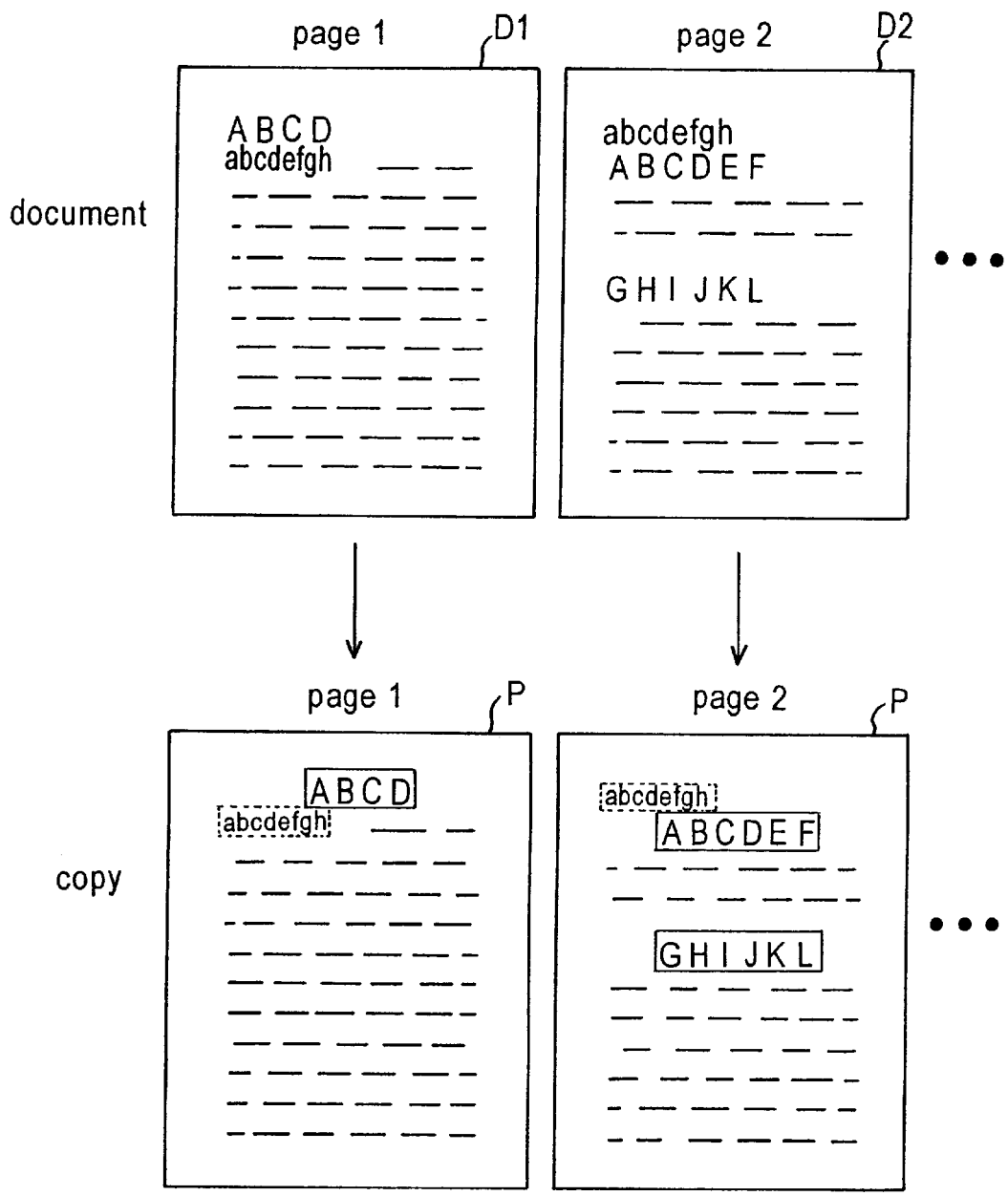
FIG. 15 shows an example of character size editing.

The editing process is performed for each editing area based on the editing contents read from editing table ET and the position information read from document management table DT (#38). For example, in the editing table ET of (a) of FIG. 6, areas having a text size of 18 points or higher are set as class 1 editing areas, and black/white reversal and centering are set as the editing conditions of these areas. Areas having a text size of 14 to 18 points are set as class 2 editing areas, and halftone is set as the editing conditions of these areas. Class 3 and class 4 areas are not set. Text smaller than 14 points is copied without any additional processing. On the other hand, the coordinates of the starting point and ending point of class 1 and class 2 areas are stored in the document management table DT, as shown in FIG. 7. focusing on page 1 (i.e., the first page of the document) in the example of FIG. 7, there is a single class 1 area with specified starting point of (25, 30) and ending point of (40, 70), and a single class 2 area with specified starting point of (40, 30), and ending point of (50, 70). On page two, there are two class 1 areas, and one class 2 area. Accordingly, in both pages 1 and 2 of this example, character strings of 18 points and larger in the document are edited by black/white reversal and centering, and character strings between 14 points and 18 points are edited by halftone. FIG. 15 shows the relationship between the copy and the original document corresponding to the editing content of editing table ET1 of (a) of FIG. 6.

After the editing process is accomplished based on the information of both the document management table DT and editing table ET, the obtained image data are written to image memory 304, and a one-page copy image is virtually written (#39, #40). When a combining process is required as in the case of table of contents generation, image positions are considered so as to not cause overlap of the plurality of images to be printed, and said combining is accomplished by the image memory 304 (#39, #41). When the one-page virtual image is completed, image data D3 are transmitted from the image memory 304 to the print process unit 40 (#42).

Figure 16:
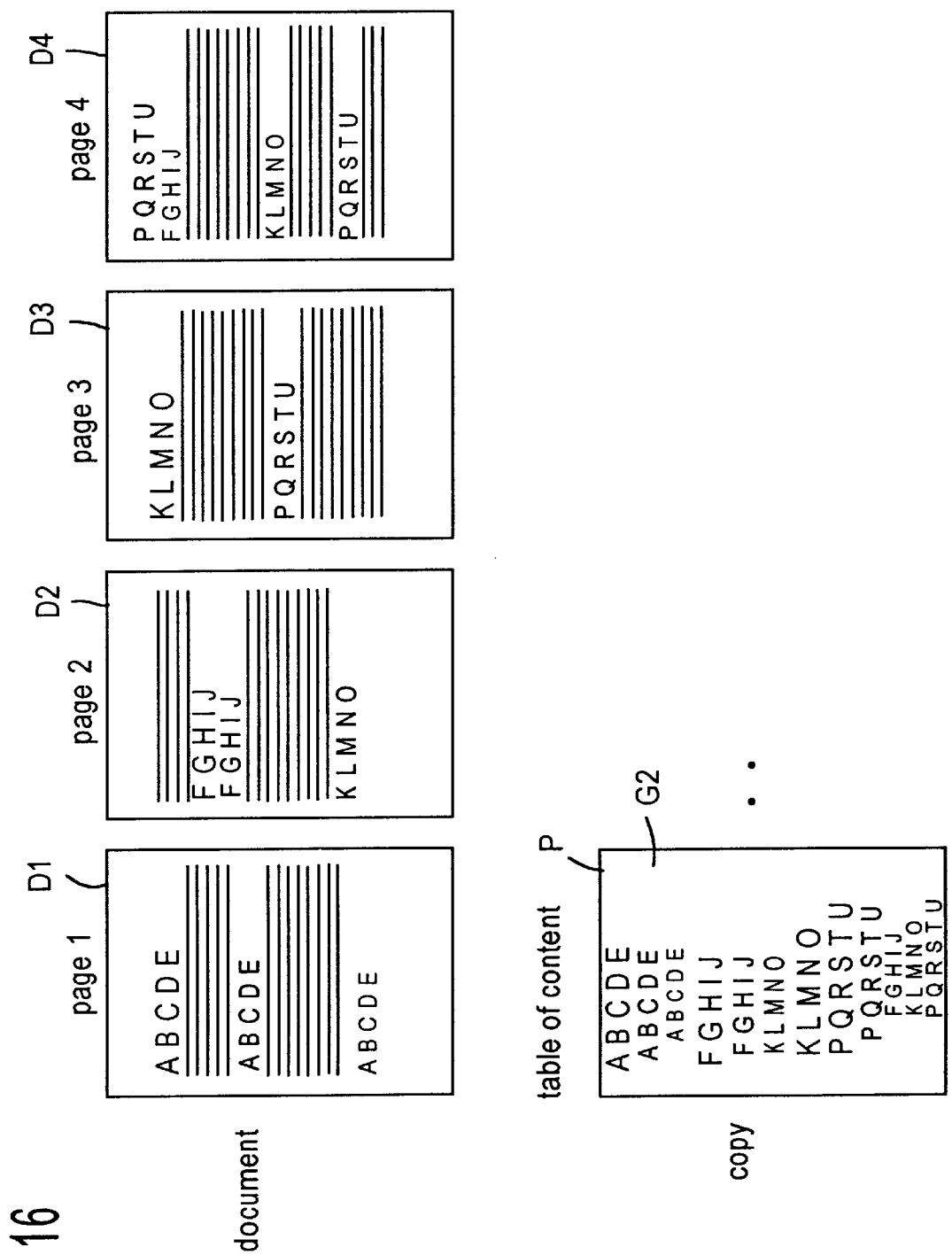
FIG. 16 is a modal view of table of contents generation via the character size editing function.

As shown in FIG. 16, when generating a table of contents from a virtual image, the lead position of the image of the image memory 304 is set, and thereafter the coordinates of the starting points and ending points of the areas to be extracted from document management table DT are read, as shown in FIG, 23 (#411, #412). The image data of the editing area, i.e., image data extracted as table of contents, are read from the code memory 306, and text decoration processing is executed as necessary (#413).

When generating a hierarchical table of contents, the position of line direction Y is considered so as to sequentially shift the header, for example, only 10 mm on sheet P for each line, and the image data are written to the image memory 304 (#414 through #417). That is, level 1 is set at the writing position with coordinates (X, Y), level 2 is set at the writing position at coordinates (X, Y+10) shifted 10 spaces past the level 1 line start, and level 3 is set at the writing position at coordinates (X, Y+20) shifted 20 spaces past the level 1 line start.

When writing of a first editing area is completed, the image starting position is moved in the column direction equal to a width (X2−X1) of the written area in the column direction so as to avoid overlapping images in the column direction, and thereafter the next area is written (#418, #419).

For example, a hierarchical table of contents can be generated by writing text columns of three levels from a single document or a plurality of documents, as in the case of editing table ET2 of (b) of FIG. 6. In editing table ET2, areas of text size of 24 points and larger are designated class 1 editing areas, and these areas are specified as the level 1 as the main header of the table of contents. The editing content for class 1 areas is not specified. Areas of text between 18 points and 24 points in size are set as class 2 editing areas, and level 2 is specified for these areas as mid headers in the table of contents. A process for moving the line 10 mm toward the end point side (right side) is specified as the editing content for class 2 areas. Areas of text between 14 points and 18 points in size are set as class 3 editing areas, and level 3 is specified for these areas as minor header in the table of contents. A process for moving the line 20 mm toward the end point side (right side) is specified as the editing content for class 3 areas. Areas of text less than 14 points in size are set as class 4 editing areas, and the text of this class of area are deleted. Accordingly, in this example, text of 14 points and larger are used to create a three level table of contents wherein the main header, mid header, and minor header are sequentially indented 10 mm. FIG. 16 illustrate table of contents generation via the text size editing function, and FIG. 6(*b*) relationship between the copy and the original document corresponding to the editing content of the editing table ET2. In FIG. 16, a copy image G2 of a table of contents comprising headers of three levels extracted from a plurality of documents D1 through D4 is printed on copy sheet P.

The previously described text size editing extracts editing areas from among all areas of those read areas of a document. In the following example, editing areas are extracted from among a part of the read areas of a document.

Figure 17:
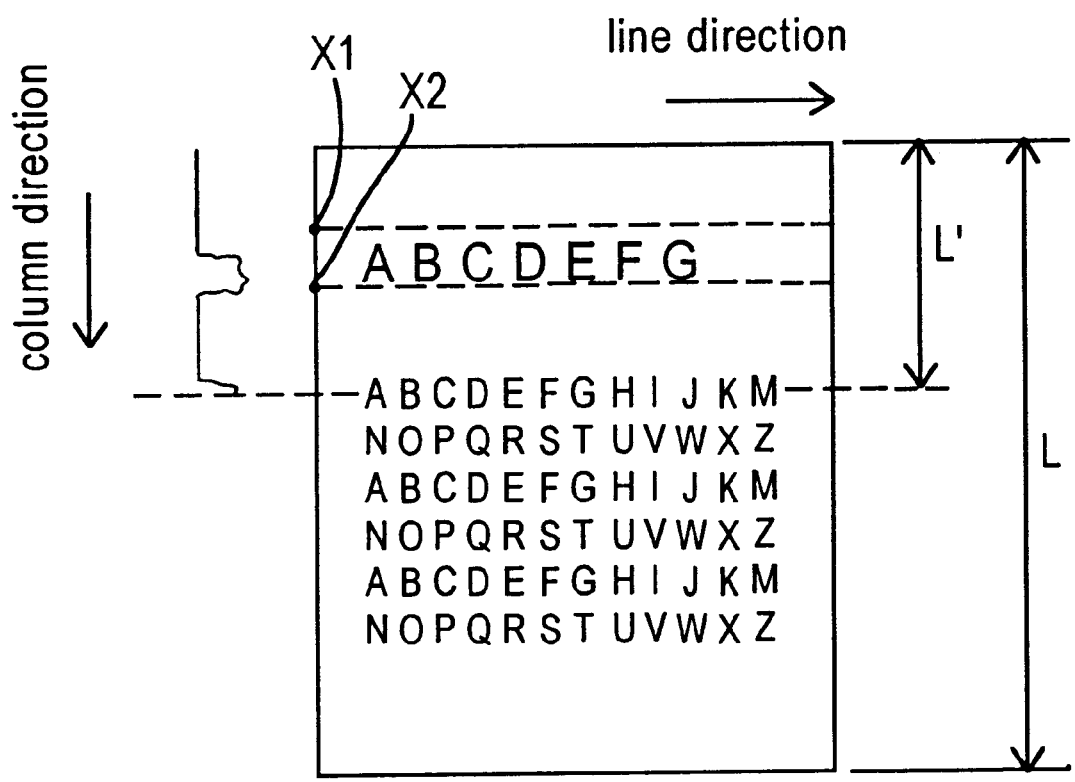
FIG. 17 is a modal view of another example of region extraction.
Figure 24:
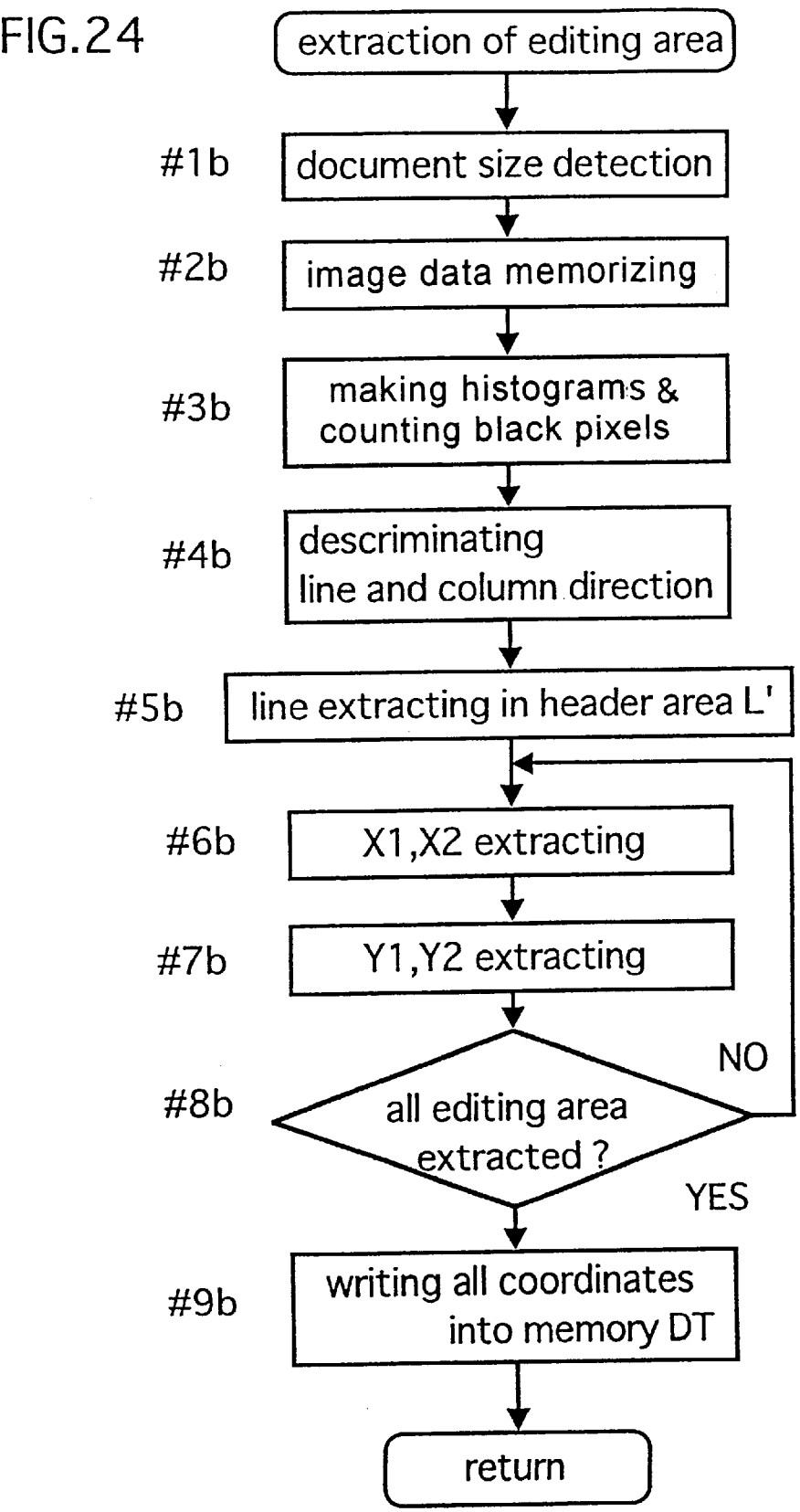
FIG. 24 is a flow chart showing another example of the extraction of the editing region.

FIG. 24 is a flow chart showing another example of an algorithm for extracting editing areas. FIG. 17 illustrates area extraction relative to FIG. 24.

The sequence of FIG. 24 is basically identical to the previously described sequence of FIG. 19. The characteristics of FIG. 24 compared to those of FIG. 19 are such that, in step #5*b*, the range of the line slice is limited to the portion of length L' at the leading edge side of the document, i.e., the header area of the document sheet. The length L' is restricted to a range shorter than the total length L in the document column direction, as shown in FIG. 17. The time required for line slicing can be reduced by restricting the range of line slicing in this manner, thereby accelerating the editing process. Effectiveness is particularly great in the case of editing numerous documents. The header length L' may be suitably set by a user using the ten-key pad 92 on the operation panel OP.

Text size editing via the sequence of FIG. 24 is suitable, for example, when producing a list of titles of a plurality of types. Since titles are generally arranged at the top of the sheet surface, titles can be extracted without including extraneous material by suitably selecting length L'.

Figure 18:
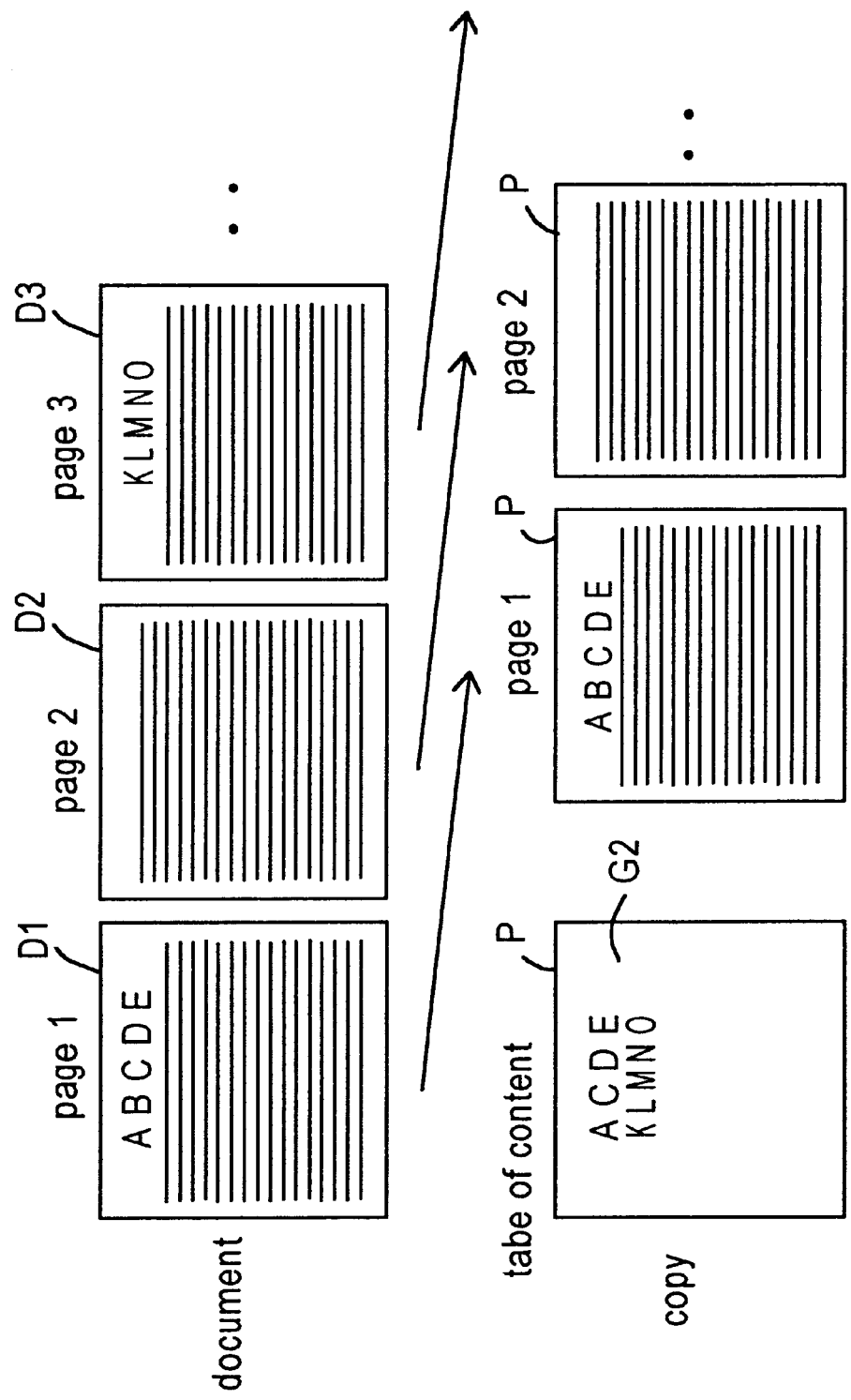
FIG. 18 shows another example of character size editing.
Figure 25:
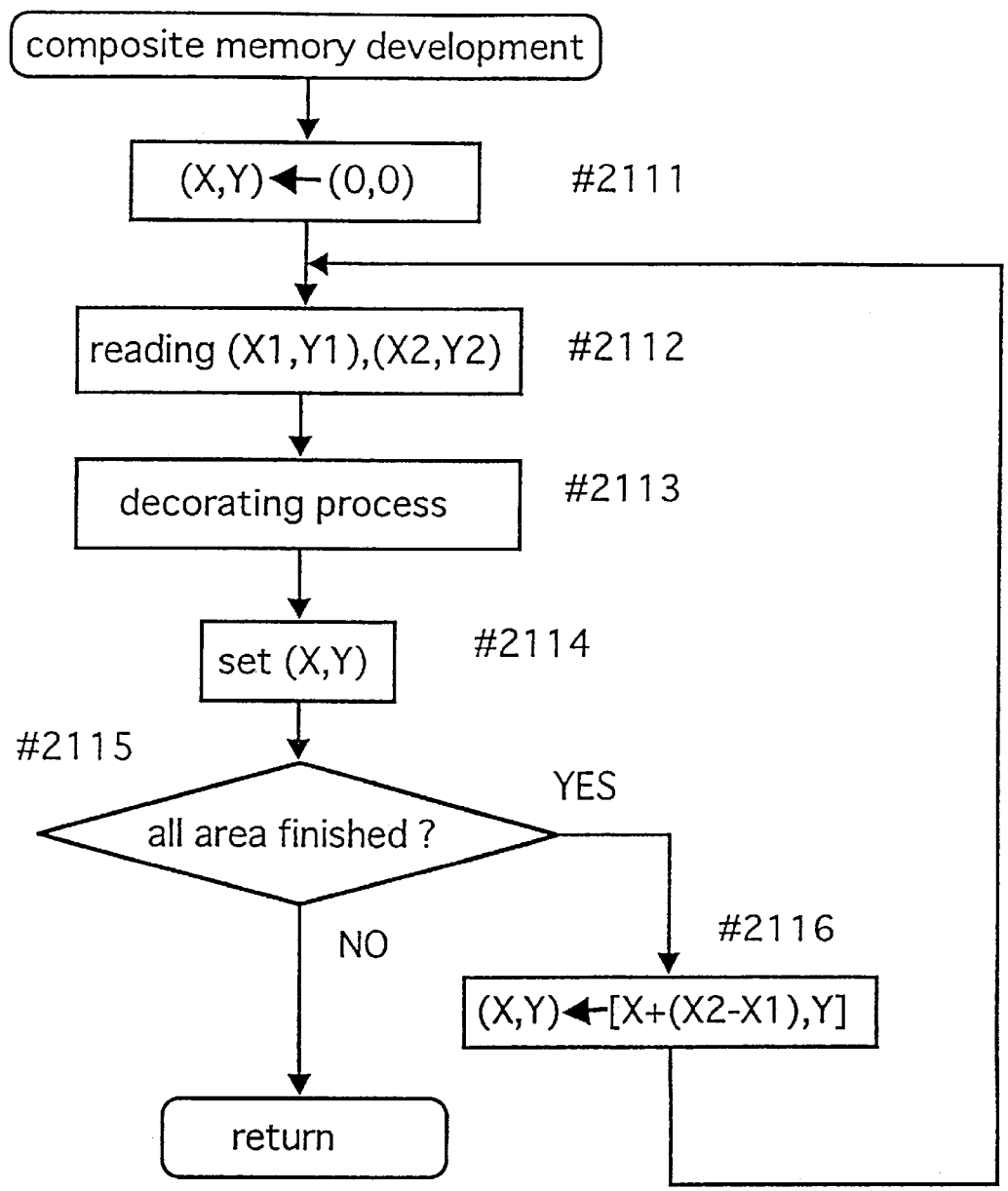
FIG. 25 is a flow chart of the composite memory development process when the character size of the table of contents title is one type.

FIG. 18 illustrates table of contents generation relative to FIG. 24. FIG. 25 is a flow chart of the combining memory development process when the table of contents header text size is a single type. The example of FIG. 18 shows the relationship between a copy and original document corresponding to editing table ET3 of (c) of FIG. 6.

In the example of FIG. 18, the phrases comprising the large size text (18 points and larger) of a plurality of documents D1 through D3 are extracted, and printed in array in the reading sequence on copy sheet P. Furthermore, copies of said documents D1 through D3 are generated using a separate sheet P from the table of contents. When the size of text extracted from a document is limited to a single size as in the case of FIG. 18, sizes may be set by a user by inputting numerical values, or the largest size text may be automatically extracted from among the sliced lines.

In the present invention, the type of editing is not limited. For example, in the case of a color copying apparatus, editing may be executed to modify the color of an area of a particular text size. Furthermore, the present invention is suitable not only for copying apparatus 1, but also for image input devices such as image readers.

The content (text size, table of contents conditions, editing content) of the editing table ET may be such as to prevent modification by a user presetting said editing content in each apparatus.

Although the present invention has been fully described by way of examples with reference to the accompanying drawings, it is no be noted that various changes and modifications will be apparent to those skilled in the art. Therefore, unless otherwise such changes and modifications depart from the scope of the present invention, they should be construed as being included therein.

What is claimed is:

1. An image editing apparatus which edits an image having a plurality of character images, comprising:
   an automatic extraction means for automatically extracting a predetermined size image having characters of predetermined size;
   a storage which stores a relationship between a character size and kind of editing process; and
   an editing process means for automatically executing an editing process for said predetermined size image extracted by said extraction means in accordance with the relationship stored in the storage.

2. The image editing apparatus according to claim 1, wherein said extraction means makes a histogram expressing the pixel distribution characteristics of said image, detects a line direction and a column direction of said image from said histogram, and extracts said image having said predetermined size.

3. The image editing apparatus according to claim 1, wherein said editing process means decorates only an extracted image.

4. The image editing apparatus according to claim 3, wherein said editing process means overlays fine dots over said image.

5. The image editing apparatus according to claim 1, wherein said editing process means prints only an extracted image.

6. The image editing apparatus according to claim 1, wherein said predetermined size is changeable.

7. The image editing apparatus according to claim 1, wherein said predetermined size corresponds to a font size.

8. The image editing apparatus according to claim 1, wherein a content of said editing process is changeable.

9. The image editing apparatus according to claim 1, further comprising:
   scanner which reads image data of a document having a plurality number of sheets printed with a plurality of line data, and
   wherein said editing process means prints only said image having said predetermined size so as to make a table of contents of said document.

10. An image editing apparatus which edits text image having a plurality of character line images along a predetermined direction, comprising:
    a scanner which reads text image;
    a histogram generating means for generating histograms expressing the distribution characteristics of said text image read by said scanner;
    a storage which stores a relationship between a character size and a kind of editing process;
    a detection means for detecting a line direction and a column direction of said text image from said histogram, and
    for automatically extracting a first character line image having a first predetermined size and a second character line image having a second predetermined size,
    said first predetermined size being different from said second predetermined size and;
    an editing process means for executing a first editing process for said first character line image and for executing a second editing process for said second character line image in accordance with the relationship stored in the storage, said first editing process being different from said second editing process.

11. The image editing apparatus according to claim 10, wherein said first editing process means decorates only said first character image.

12. The image editing apparatus according to claim 11, wherein said editing process means overlays fine dots over said first character image.

13. The image editing apparatus according to claim 10, wherein said first predetermined size and said second predetermined size are changeable.

14. The image editing apparatus according to claim 10, wherein said first predetermined size and said second predetermined size correspond to a font size.

15. The image editing apparatus according to claim 10, wherein a content of said first editing process and said second editing process are changeable.

16. The image editing apparatus according to claim 10, wherein said scanner reads a document having a plurality number of text images, and
    wherein said editing process means prints only said first character and said second character images onto a sheet so as to make a table of contents of said document.

17. The image editing apparatus according to claim 16, wherein a starting position for printing said first character image is a first position in the column direction of said sheet, and
    wherein a starting position for printing said second character image is a second position in the column direction of said sheet,
    said second position moving predetermined distance toward column direction for said first position.

18. An image editing apparatus which edits text image having a plurality of line images along a predetermined direction comprising:
    a scanner for reading text image;
    a histogram generating means for generating histograms expressing the distribution characteristics of said text image read by said scanner;

a storage which stores a relationship between a character size and a kind of editing process;

a detection means for detecting a line and column direction of said text image based on said histogram, and for automatically extracting a minimum rectangle containing an entire line image of image data having a predetermined size; and an editing process means for executing an editing process for said entire line image contained in said minimum rectangle in accordance with the relationship stored in the storage.

19. The image editing apparatus according to claim 18, wherein said editing process means decorates only said extracted entire image.

20. The image editing apparatus according to claim 19, wherein said editing process means overlays fine dots over said extracted entire image.

21. The image editing apparatus according to claim 18, wherein said editing process means prints only said extracted entire image.

22. The image editing apparatus according to claim 18, wherein said predetermined size is changeable.

23. The image editing apparatus according to claim 18, wherein said predetermined size corresponds to a font size.

24. The image editing apparatus according to claim 18, wherein a content of said editing process is changeable.

25. The image editing apparatus according to claim 18,
wherein said scanner reads image data of a document having a plurality number of sheets printed with a plurality of line data, and wherein said editing process means prints only said entire image contained in said minimum rectangle so as to make a table of contents of said document.

26. An image editing apparatus which edits text image data having a plurality of character line images along a predetermined direction, comprising:

a scanner which reads a document having a plurality number of text images;

a histogram generating means for generating histograms expressing the distribution characteristics of said text image read by said scanner, and for automatically extracting minimum rectangles containing each character line images;

a storage which stores a relationship between a character size and a kind of editing process;

a detection means for detecting a first rectangle corresponding to a first predetermined size and a second rectangle corresponding to a second predetermined size, said first predetermined size being different from said second predetermined size; and an editing process means for executing a first editing process for image data in said first rectangle and a second editing process for image data in said second rectangle in accordance with the relationship stored in the storage, said first editing process being different from said second editing process.

27. An image editing apparatus which edits an image having a plurality of characters which include plural sizes, said apparatus comprising:

input means for inputting a first size;

designating means for designating a kind of editorial process;

automatic extraction means for extracting characters of the first size inputted by said input means; and editing process means for executing the editorial process designated by said designating means for said characters extracted by said extraction means.

28. The image editing apparatus according to claim 1, wherein said editing process means is automatic.

29. The image editing apparatus according to claim 10, wherein said editing process means is automatic.

30. The image editing apparatus according to claim 18, wherein said editing process means is automatic.

31. The image editing apparatus according to claim 26, wherein said editing process means is automatic.

32. The image editing apparatus according to claim 27, wherein said editing means is automatic.

33. A method of operating an image editing apparatus for editing image data, said image editing apparatus comprising an interactive control system, an interface device which a user operates to interact with said interactive control system, and an editing processing device which executes an editing process in response to commands from said interactive control system, the method comprising the steps of:

extracting an editing area in which a document is edited;

selecting a text size editing operation on said interface device;

reading out current editing conditions from an editing table;

displaying the current editing conditions on a display;

determining if a modification request has been received to modify the current editing conditions;

if no modification request has been received, then editing the document according to the current editing conditions;

if a modification request has been received, then modifying the current editing conditions, storing the modified current editing conditions and editing the document according to the modified current editing conditions.

34. A method of operating an image editing apparatus for editing image data as claimed in claim 33,
wherein said step of extracting an editing area further comprises the sub-steps of:

detecting a size of a document and writing the detected size in a document management table;

storing image data read from said document;

generating histograms to indicate the distribution of black pixels in both a main scanning direction and a subscanning direction;

discriminating a horizontal line direction and a vertical column direction based on said histograms;

discriminating lines and line spacing and determining the size of text within said discriminated lines;

defining an area of discriminated lines which have the same text size by horizontal and vertical coordinates as said editing area; and writing the horizontal and vertical coordinates in said document management table.

35. A method of operating an image editing apparatus for editing image data as claimed in claim 34,
wherein in said sub-step of discriminating a horizontal line direction and a vertical column direction, said discrimination is based on the intersection of areas having a majority of black pixels and areas completely lacking pixels in either the main scanning direction or the subscanning direction.

36. A method of operating an image editing apparatus for editing image data as claimed in claim 33, wherein said step of modifying the current editing conditions further comprises the sub-steps of:
 receiving a selection of an area to be modified, by a user selection through said interface device;
 requesting the user to change the text size to a desired text size;
 displaying an editing selection menu which contain a plurality of predetermined editing methods for the user to choose.

37. A method of operating an image editing apparatus for editing image data as claimed in claim 36,
 wherein said sub-step of changing the text size to a new text size further comprises the sub-steps of:
  reading binary image data;
  reading data from the editing table;
  extracting areas by matching a present text size as an editing area;
  performing separate editing operations on the extracted areas based on the text size;
  combining the separately edited areas into one document so as to not cause overlap of the separate areas to be printed; and
  outputting the combined separately edited areas to a printing device as one document.

38. A method of operating an image editing apparatus for editing image data as claimed in claim 37,
 wherein said sub-step of combining the separately edited areas into one document requires development of a composite memory which comprises the steps of:
  extracting coordinates of starting and ending points of a selected edited area;
  performing a text decorating process on the selected edited area;
  shifting the selected edited area according to the text size of the area when creating a hierarchical table of contents;
  writing the selected area at the desired shifted location;
  moving the image starting position in the column direction by a distance equal to the width of the written selected area to avoid overlapping images in the column direction; and
  performing the above processing on another selected editing area.

39. A method of operating an image editing apparatus for editing image data as claimed in claim 33,
 wherein said step of modifying the current editing conditions further comprises the sub-steps of:
  receiving a request from a user through said interface device to generate a table of contents;
  displaying a table of contents setting screen which allows the user to set at least one of the text size of each level of a plurality of levels of said table of contents, header layouts, and text decoration,
  wherein said table of contents setting menu further allows the user to select a header layout format of said generated table of contents to be in a parallel format or a hierarchical format with indent positions corresponding to sequential levels of said plurality of levels.

40. An image editing apparatus which edits an image having a plurality of images along a predetermined direction, comprising:
 an extraction device which extracts character images;
 a size detection device which detects the size of the extracted character images; and
 an editing device which automatically edits the extracted character images according to a predetermined manner based on the detected size of the extracted character images.

41. An image editing apparatus which edits an image having a plurality of images along a predetermined direction, comprising:
 a storage which stores a relationship between a character size and a kind of editing process;
 an extraction device which extracts character images;
 a size detection device which detects the size of the extracted character images; and
 an editing device which automatically edits extracted character images in accordance with the relationship stored in the storage, the editing device editing extracted character images having a first size according to a first predetermined manner and editing extracted character images having a second size in a second predetermined manner.

42. A method of editing an image having a plurality of images along a predetermined direction, comprising:
 extracting character images;
 detecting the size of the extracted character images; and
 editing the extracted character images according to a predetermined manner based on the detected size of the extracted character images.

43. The method according to claim 42, wherein the step of editing the extracted character images further includes the steps of:
 editing extracted character images having a first size in a first predetermined manner; and
 editing extracted character images having a second size in second predetermined manner.

44. An image editing apparatus which edits an image having a plurality of characters which include plural sizes, said apparatus comprising: a storage which stores an editing table having a relationship between a character size and a kind of editorial process;
 an extractor which extracts characters;
 a detector which detects a character size of the extracted characters; and
 an editor which executes an editorial process corresponding to the detected size in the editing table on the extracted characters.

45. An image editing apparatus which edits an image having a plurality of characters which include plural sizes, said apparatus comprising:
 an input device which inputs a size of character to be edited and a kind of editing process to be applied to characters having the size; and
 an extractor which extracts characters having the size inputted by the input device for the characters extracted by the extractor.

* * * * *